(12) United States Patent
Tsuruta

(10) Patent No.: US 12,069,209 B2
(45) Date of Patent: Aug. 20, 2024

(54) INFORMATION PROCESSING APPARATUS, INFORMATION PROCESSING METHOD, AND STORAGE MEDIUM THAT DETERMINE WHETHER A CURRENT VALUE OF A NON-POSITION ATTRIBUTE VALUE ON WHICH AN OPERATION OF CHANGING IS BEING PERFORMED IS WITHIN A PREDEFINED RANGE

(71) Applicant: CANON KABUSHIKI KAISHA, Tokyo (JP)

(72) Inventor: Hirofumi Tsuruta, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 122 days.

(21) Appl. No.: 17/717,665

(22) Filed: Apr. 11, 2022

(65) Prior Publication Data
US 2022/0337709 A1    Oct. 20, 2022

(30) Foreign Application Priority Data

Apr. 15, 2021  (JP) ................................. 2021-069208
Aug. 13, 2021  (JP) ................................. 2021-131996

(51) Int. Cl.
*H04N 1/00*  (2006.01)
*H04N 1/387* (2006.01)

(52) U.S. Cl.
CPC ..... *H04N 1/00196* (2013.01); *H04N 1/00442* (2013.01); *H04N 1/00466* (2013.01); *H04N 1/3872* (2013.01); *H04N 1/3877* (2013.01)

(58) Field of Classification Search
None
See application file for complete search history.

(56) References Cited

U.S. PATENT DOCUMENTS 11,055,925 B1 * 7/2021 Bhushan ............... G06T 19/006
11,069,027 B1 * 7/2021 Jain ........................... G06T 3/60
(Continued)

FOREIGN PATENT DOCUMENTS

| CA | 2836696 | * 12/2000 | ............ G06F 3/048 |
| JP | H08202714 | * 8/1996 | ............ G06F 17/21 |

(Continued)

OTHER PUBLICATIONS

T. Masui, "HyperSnapping," Proceedings IEEE Symposia on Human-Centric Computing Languages and Environments (Cat. No. 01TH8587), Stresa, Italy, 2001, pp. 188-194, doi: 10.1109/HCC.2001.995258. (Year: 2001).*

*Primary Examiner* — Beniyam Menberu
(74) *Attorney, Agent, or Firm* — Venable LLP

(57) ABSTRACT

An information processing method includes obtaining operation information from an operation input apparatus that sequentially inputs a continuously changing operation position, changing a non-position attribute value for an operation-target object in accordance with a change in the operation position, determining whether the operation information indicates an operation of changing the non-position attribute value being performed, while the operation of changing the non-position attribute value is performed, extracting the non-position attribute value for a second object, the non-position attribute value of the second object being of a same attribute as the non-position attribute value on which the operation of changing is being performed, and determining whether a current value of the non-position attribute value on which the operation of changing is being performed is within a predefined range. The current value is changed to the non-position attribute value for the second object when the current value is within the predefined range.

13 Claims, 24 Drawing Sheets

(56) References Cited

U.S. PATENT DOCUMENTS

| | | | |
|---|---|---|---|
| 11,250,607 B1* | 2/2022 | Jain | G06T 11/203 |
| 2013/0014041 A1* | 1/2013 | Jaeger | G06F 3/0486 |
| | | | 715/764 |
| 2016/0092080 A1* | 3/2016 | Swanson | G06F 3/04883 |
| | | | 345/654 |
| 2016/0179336 A1* | 6/2016 | Ambrus | G02B 27/017 |
| | | | 715/768 |
| 2016/0334971 A1* | 11/2016 | Buchanan | G06F 30/00 |
| 2017/0329488 A1* | 11/2017 | Welker | G06F 3/011 |
| 2022/0084279 A1* | 3/2022 | Lindmeier | G06F 3/017 |
| 2022/0130085 A1* | 4/2022 | Kumawat | G06F 40/103 |

FOREIGN PATENT DOCUMENTS

| | | | | |
|---|---|---|---|---|
| JP | 2021026705 A | | 2/2021 | |
| KR | 20190038886 | * | 4/2019 | H04N 13/395 |
| KR | 20210040309 | * | 4/2021 | G06F 3/0481 |
| WO | 199117512 A1 | | 11/1991 | |

* cited by examiner

DRAG START INFORMATION

| MOUSE POSITION (X) |
|---|
| MOUSE POSITION (Y) |
| DRAG START OBJECT POSITION (X) |
| DRAG START OBJECT POSITION (Y) |
| DRAG START OBJECT WIDTH |
| DRAG START OBJECT HEIGHT |
| POINTER TO EDIT-TARGET OBJECT LIST |
| DRAG START CENTER COORDINATES OF ICON |
| DRAG START ROTATION ANGLE |

FIG.10A

EDIT-TARGET OBJECT LIST

| EDIT-TARGET OBJECT POINTER 1 |
|---|
| EDIT-TARGET OBJECT POINTER 2 |
| EDIT-TARGET OBJECT POINTER 3 |
| ⋮ |
| EDIT-TARGET OBJECT POINTER n |

FIG.10C

OBJECT INFORMATION ARRAY

| IMAGE OBJECT 1 ON TWO-PAGE SPREAD 1 |
|---|
| IMAGE OBJECT 2 ON TWO-PAGE SPREAD 1 |
| IMAGE OBJECT 3 ON TWO-PAGE SPREAD 1 |
| ⋮ |
| IMAGE OBJECT n ON TWO-PAGE SPREAD 1 |

OBJECT INFORMATION

| POSITION |
|---|
| SIZE |
| ROTATION ANGLE |
| FILE PATH |
| OPACITY |
| FILTER LEVELS (SUCH AS SEPIA EFFECT) |
| CIRCUMSCRIBING RECTANGLE (rect) |
| HIGHLIGHT DISPLAY SET/UNSET On/Off |
| b-VALUE LIST (b1) |
| (b2) |
| (b3) |
| (b4) |

FIG.10B

INFORMATION PROCESSING APPARATUS, INFORMATION PROCESSING METHOD, AND STORAGE MEDIUM THAT DETERMINE WHETHER A CURRENT VALUE OF A NON-POSITION ATTRIBUTE VALUE ON WHICH AN OPERATION OF CHANGING IS BEING PERFORMED IS WITHIN A PREDEFINED RANGE

CROSS-REFERENCE TO RELATED APPLICATIONS

This application claims the benefit of Japanese Patent Application No. 2021-069208, filed Apr. 15, 2021, and No. 2021-131996, filed Aug. 13, 2021, each of which is hereby incorporated by reference herein in its entirety.

BACKGROUND OF THE INVENTION

Field of the Invention

The present disclosure relates to a layout editing technique for laying out a plurality of objects on a layout surface.

Description of the Related Art

In such fields as presentation document creation software or CAD software, object snapping is known as a method for operability improvement for a user operation of placing an object on a layout surface. In the event of placing or re-placing an object in response to a user operation corresponding to adding, moving, scaling up, or scaling down the object, object snapping allows an endpoint, a midpoint, or the like, of the operation-target object to be placed accurately at a predetermined point. International Publication No. WO91/17512 discloses an object snapping method for use in the field of CAD systems. With this method, an endpoint, a midpoint, or the like, of an object on which to perform a placement operation is automatically aligned to a point of note, such as an endpoint, a midpoint, or the like, of a different object already placed.

Layout editing for laying out a plurality of objects on a layout surface is required not only to determine the positions and sizes of the objects on the layout surface, but also to determine attribute values of attributes other than the positions and sizes of the objects (such attributes are here after referred to as "non-position attributes"). However, the technique disclosed in International Publication No. WO91/17512 (hereafter referred to as "the prior art") does not take changes in the attribute values of non-position attributes (hereafter referred to as "non-position attribute values") into account. For this reason, it is difficult for the prior art to easily edit or to create a layout providing a sense of unity in design having matching non-position attribute values.

SUMMARY

An information processing method according to the present disclosure includes the steps of obtaining operation information from an operation input apparatus capable of sequentially inputting a continuously changing operation position, changing a non-position attribute value for a first object that is an operation-target object in accordance with a change in the operation position corresponding to the operation information, determining whether the operation information indicates that an operation of changing the non-position attribute value is being performed, while the operation of changing the non-position attribute value is being performed, extracting the non-position attribute value for a second object different from the first object, the non-position attribute value of the second object being of a same attribute as the non-position attribute value on which the operation of changing is being performed, and determining whether a current value of the non-position attribute value on which the operation of changing is being performed is a value within a range predefined based on the non-position attribute value for the second object. In the above method, in a case when it is determined that the current value is a value within the range predefined based on the non-position attribute value for the second object, the current value is changed to the non-position attribute value for the second object.

Further features of the present invention will become apparent from the following description of exemplary embodiments with reference to the attached drawings.

BRIEF DESCRIPTION OF THE DRAWINGS

FIG. 10A is a diagram showing an example of items in drag start information, FIG. 10B is a diagram showing an example of items in object information, and FIG. 10C is a diagram showing an example of an edit target object list;

DESCRIPTION OF THE EMBODIMENTS

Hereafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
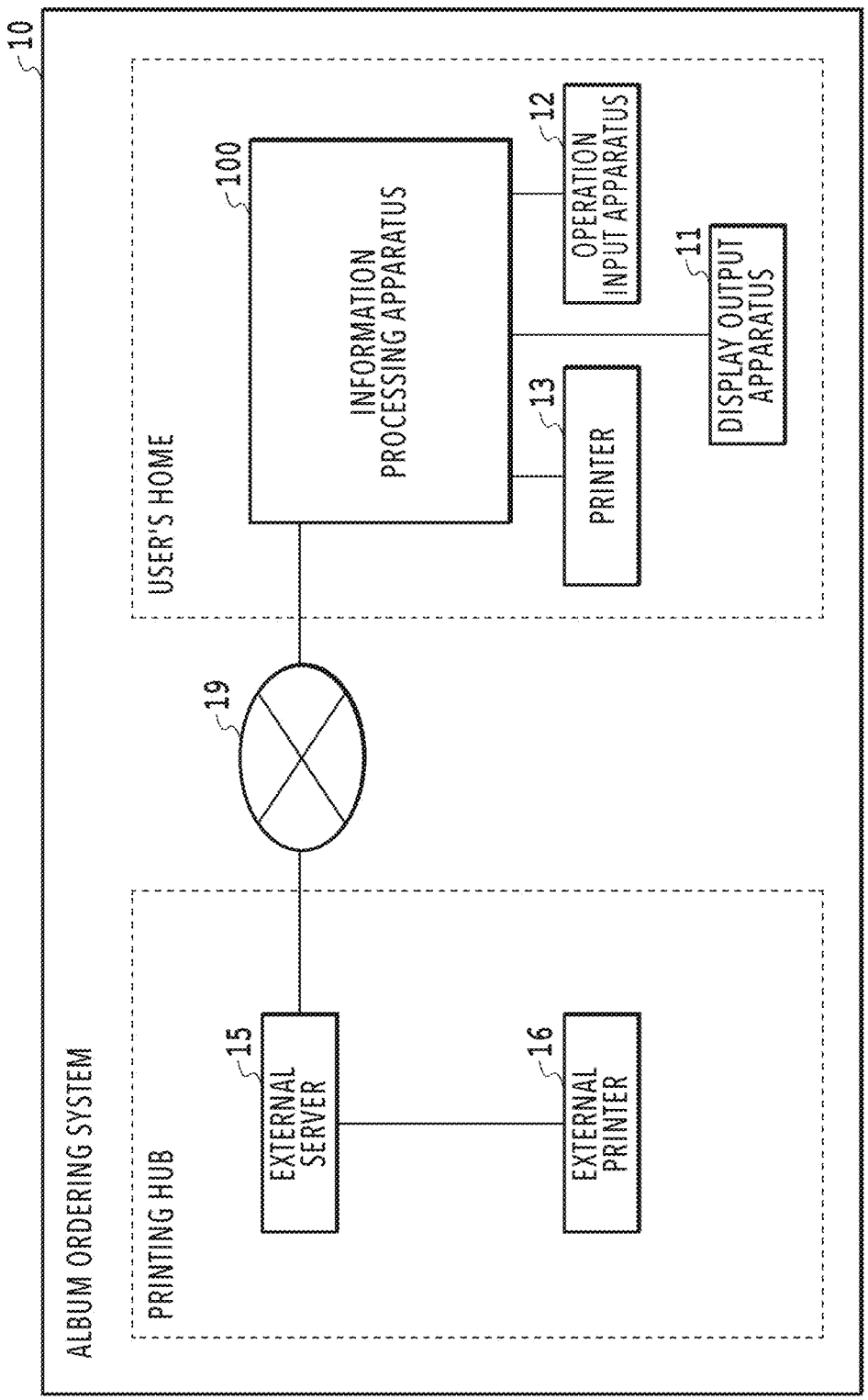
FIG. 1 is a block diagram showing an example configuration of an album ordering system.
Figure 2:
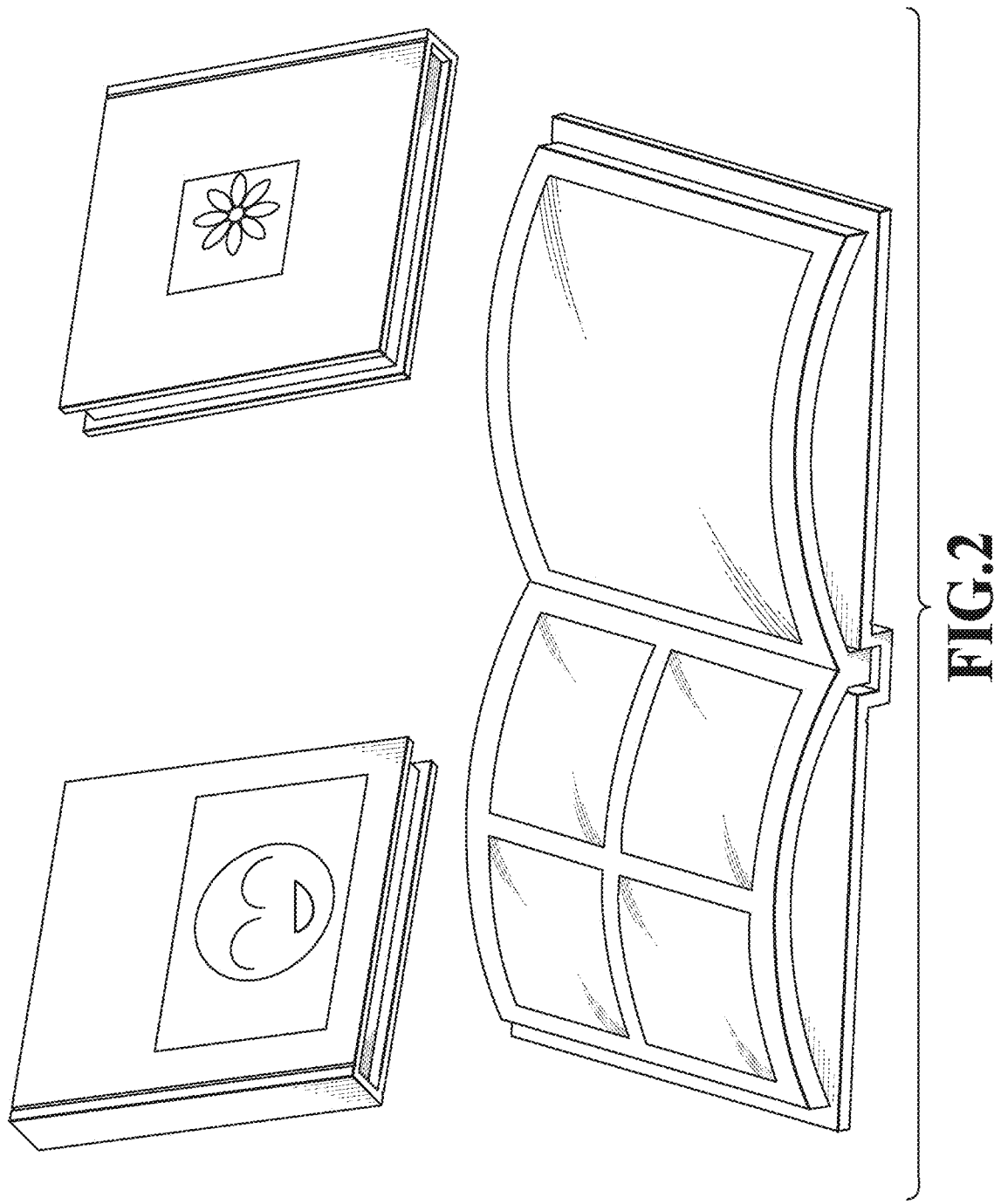
FIG. 2 is a diagram showing an example photo album created by the album ordering system.

With reference to FIGS. 1 to 11, an information processing apparatus 100 according to Embodiment 1 is described. FIG. 1 is a block diagram showing an example configuration of an album ordering system 10 to which the information processing apparatus 100 according to Embodiment 1 is applied. The album ordering system 10 includes the information processing apparatus 100, a display output apparatus 11, an operation input apparatus 12, a printer 13, an external server 15, and an external printer 16. The information processing apparatus 100 and the external server 15 are connected to each other via a communication network 19 such as an Internet connection. The information processing apparatus 100 is an apparatus for importing image data and generating album data for use to create a photo album or a photo book (here after collectively referred to as a photo album) exemplified in FIG. 2. Details of the information processing apparatus 100 will be given later. The external server 15 receives album data generated by the information processing apparatus 100 from the information processing apparatus 100 via the communication network 19 and creates a photo album. Specifically, for example, the external server 15 creates a photo album by causing the external printer 16 to print a printed item corresponding to the album data. The external server 15 and the external printer 16 are installed at, for example, a printing hub of a photo album manufacturer, or the like. For example, a photo album created at the printing hub is delivered to the address or location that the user designates using the information processing apparatus 100.

The display output apparatus 11 is a display formed of a liquid crystal display (LCD), or the like, and, in response to display information outputted from the information processing apparatus 100, displays a display image corresponding to the display information on a display screen. The operation input apparatus 12 is formed of a pointing device such as a mouse or a joystick, a touch panel, a gyroscope sensor, a keyboard, or the like, and, in response to an operation from a user (here after referred to as a "user operation"), outputs operation information corresponding to the user operation. Specifically, the operation input apparatus 12 is an apparatus capable of sequentially inputting the continuously changing operation position and outputs operation information corresponding to a user operation to the information processing apparatus 100. A user can edit album data interactively by performing a user operation using the operation input apparatus 12 while seeing the display image displayed on the display output apparatus 11. In other words, the display output apparatus 11 and the operation input apparatus 12 are used as user interfaces for editing album data in the information processing apparatus 100. In response to print information outputted from the information processing apparatus 100, the printer 13 prints a printed item corresponding to the print information. Via the information processing apparatus 100, a user can have the printer 13 print the front cover, the back cover, pages, or the like, of a photo album corresponding to the album data. For example, the information processing apparatus 100, the display output apparatus 11, the operation input apparatus 12, and the printer 13 are installed inside the house of a user, or the like.

Figure 3:
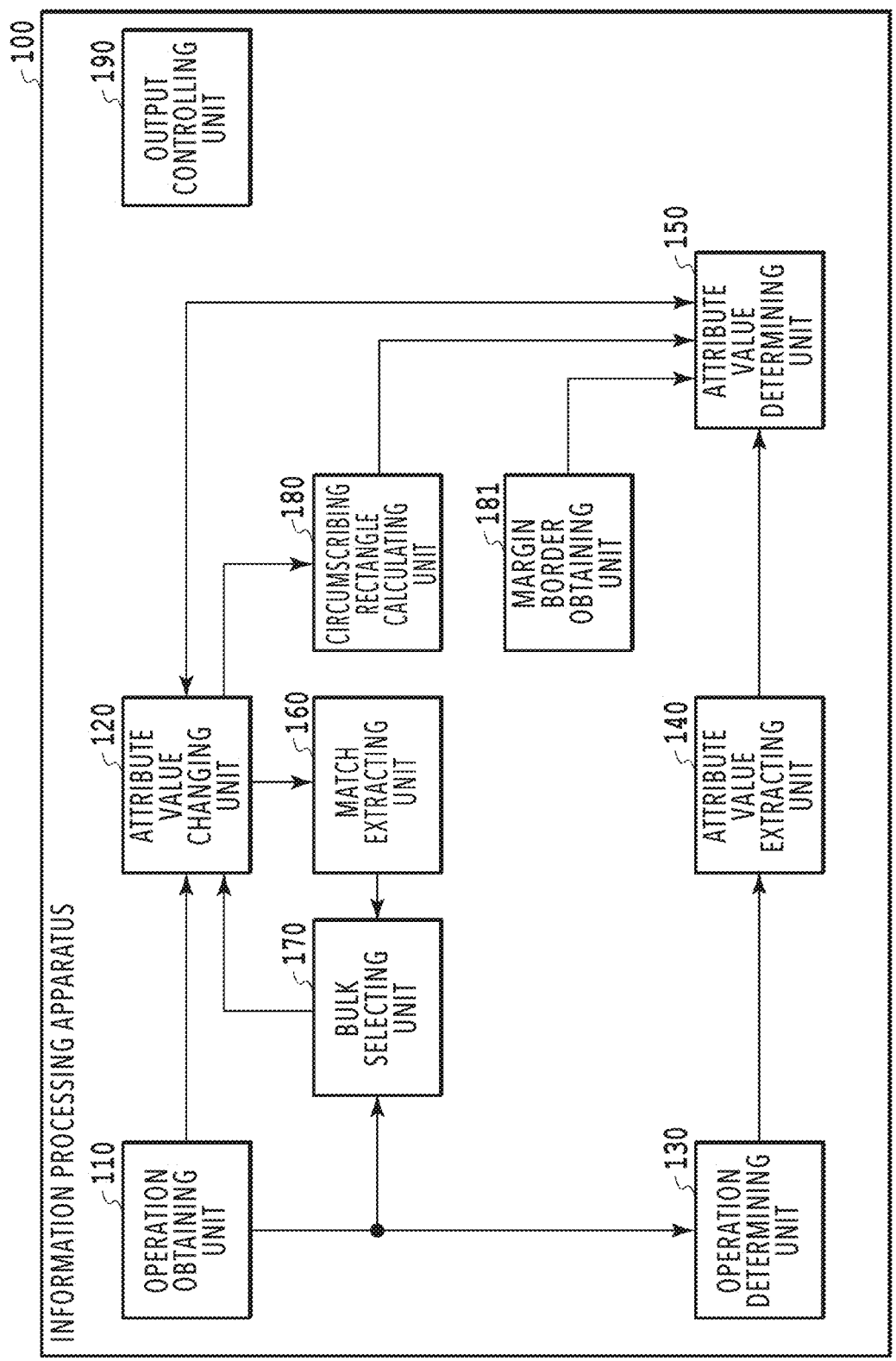
FIG. 3 is a functional block diagram showing an example configuration of an information processing apparatus.
Figure 4:
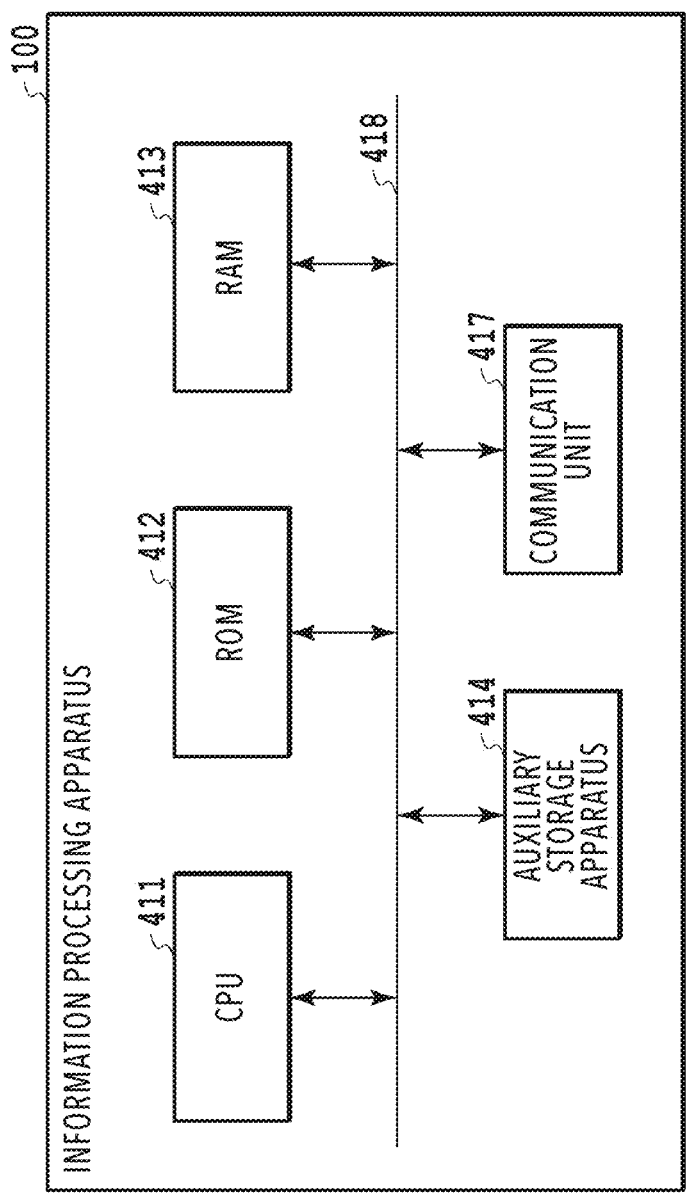
FIG. 4 is a block diagram showing an example hardware configuration of the information processing apparatus.

With reference to FIGS. 3 and 4, the configuration of the information processing apparatus 100 is described. FIG. 3 is a functional block diagram showing an example configuration of the information processing apparatus 100 according to Embodiment 1. The information processing apparatus 100 includes an operation obtaining unit 110, an attribute value changing unit 120, an operation determining unit 130, an attribute value extracting unit 140, an attribute value determining unit 150, and an output controlling unit 190. In addition to the above configurations, the information processing apparatus 100 may include a match extracting unit 160, a bulk selecting unit 170, a circumscribing rectangle calculating unit 180, and a margin border obtaining unit 181. Details of the processing performed by each unit in the information processing apparatus 100 will be described later. In particular, details of the processing performed by the match extracting unit 160, the bulk selecting unit 170, the circumscribing rectangle calculating unit 180, and the margin border obtaining unit 181 will be described in and after Embodiment 2.

Processing by the units in the information processing apparatus 100 is implemented by the following configuration incorporated in the information processing apparatus 100. For example, the above processing is implemented by software using a processor such as a central processor unit (CPU) or a graphic processor unit (GPU) and memory. The above processing may also be implemented by hardware such as an application-specific integrated circuit (ASIC) or a field programmable gate array (FPGA).

FIG. 4 is a block diagram showing an example hardware configuration that the information processing apparatus 100 has in a case when the processing by the units in the information processing apparatus 100 according to Embodiment 1 is implemented by software. The information processing apparatus 100 is formed by a computer, and the computer has a CPU 411, a ROM 412, a RAM 413, an auxiliary storage apparatus 414, a communication unit 417, and a bus 418, as exemplified in FIG. 4.

The CPU 411 is a processor that controls the computer using programs and data stored in the ROM 412, the RAM 413, or the auxiliary storage apparatus 414 to cause the computer to function as the units in the information processing apparatus 100 shown in FIG. 3. Note that the information processing apparatus 100 may have one or more dedicated pieces of hardware different from the CPU 411 so that at least part of the processing performed by the CPU 411 may be executed by the dedicated piece(s) of hardware. Examples of the dedicated hardware include an ASIC, an FPGA, and a digital signal processor (DSP). The ROM 412 is a read-only memory and stores programs, and the like, that do not need changes. The RAM 413 is a random-access memory and temporarily stores a program or data supplied from the ROM 412 or the auxiliary storage apparatus 414 or data, or the like, supplied from the outside via the communication unit 417, and is used as a work memory of the CPU 411. The auxiliary storage apparatus 414 is formed of, for example, a hard disk drive, or the like, and stores, e.g., programs or various kinds of data such as image data, audio data, and album data. The auxiliary storage apparatus 414 is not limited to being installed inside the information processing apparatus 100 and may be an external apparatus installed outside of the information processing apparatus 100. The communication unit 417 is used for communications with an apparatus external to the information processing apparatus 100. For example, in a case when the information processing apparatus 100 is connected to an external apparatus in a wired manner, a communication cable is connected to the communication unit 417, and, in a case when the information processing apparatus 100 has a capability for wireless communications with an external apparatus, the communication unit 417 includes an antenna. The bus 418 links the units in the information processing apparatus 100 to one another for communication of information.

In Embodiment 1 described below, the processing by the units in the information processing apparatus 100 is implemented by application software for editing album data (hereafter referred to as an "editing app") installed in the information processing apparatus 100. Note that, although Embodiment 1 describes a case when the editing app pre-installed in the ROM 412, or the like, operates in the information processing apparatus 100, the operating mode of the editing app is not limited to this. For example, the editing app may operate as a web application operating on a web browser. In this case, the editing app is automatically installed to the information processing apparatus 100, triggered by a user instructing the information processing apparatus 100 to access the uniform resource locator (URL) corresponding to the web application. Thus, the user does not perform the installation consciously.

A description is given of steps up to where a user orders a photo album using the album ordering system 10. Once the editing app is activated, a user can create new album data or re-edit album data. Note that, to re-edit album data, the information processing apparatus 100 obtains the album data under editing from the external server 15 via, for example, the communication network 19. Also, the information processing apparatus 100 may obtain album data by reading the album data stored in the auxiliary storage apparatus 414. Note that, in the present disclosure, descriptions are given assuming that album data is created anew.

Figure 5:
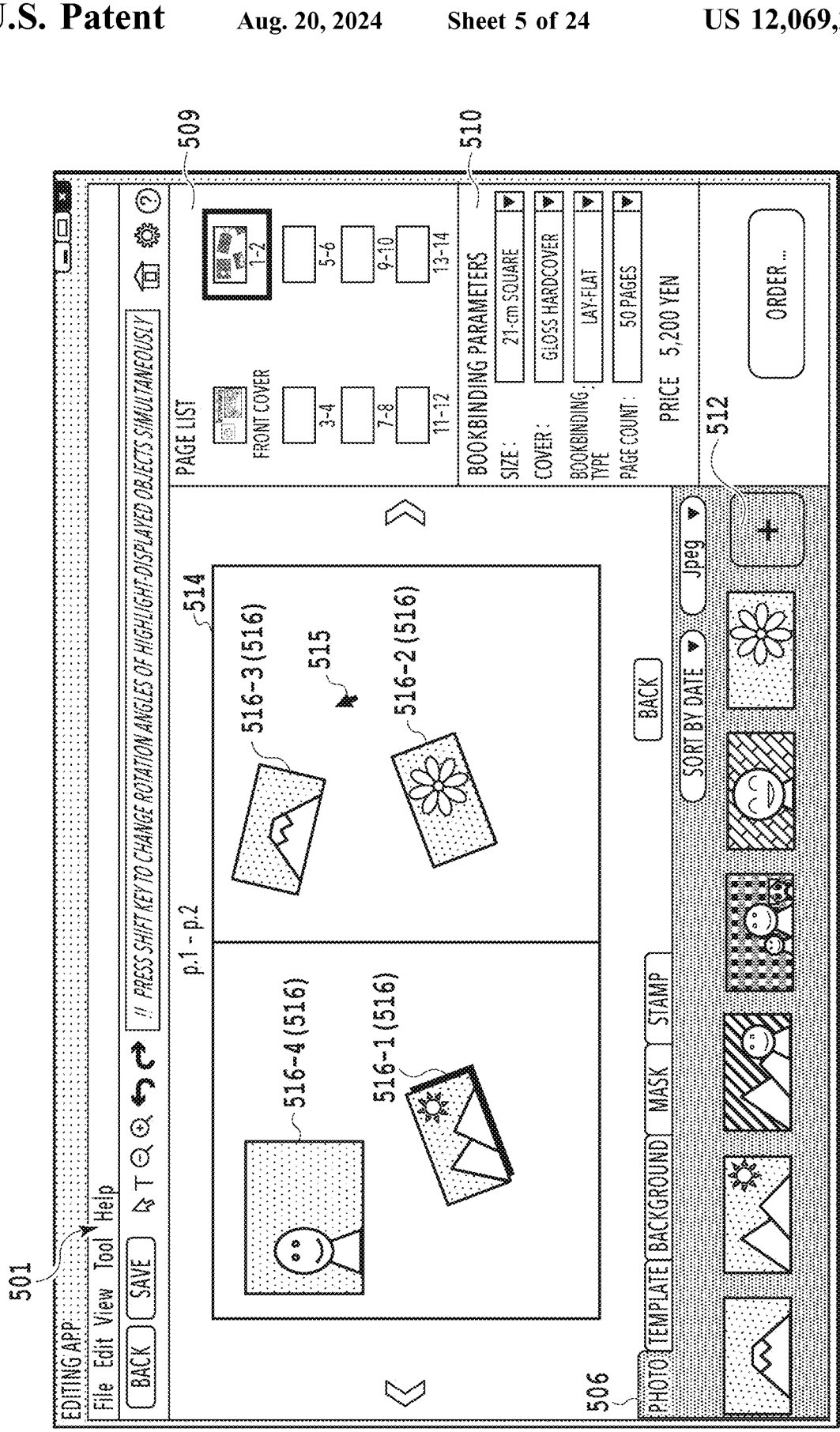
FIG. 5 is a diagram showing an example of an edit screen based on display information outputted from the information processing apparatus.

In a case of creating new album data, an edit screen 501 exemplified in FIG. 5 is displayed. On the initial edit screen 501, for example, regions other than a bookbinding parameter setting region 510 are all grayed out, and no input can be made on the regions other than the bookbinding parameter setting region 510. A user inputs and sets bookbinding parameters including album size such as 21-cm square or A4, cover type such as hardcover or softcover, and page count such as twenty pages or thirty pages. Note that the setting items are not limited to the above and may include paper type, and the like. After parameters are inputted to all the setting items, the price of the album is calculated and displayed. After the calculation result of the price is displayed, a page list region 509 is un-grayed out, and a list of two-page spreads based on the bookbinding parameters specified by the user is displayed. In response to the user selecting, in the page list region 509, a two-page spread on which the user wants to start editing, a page image for a two-page spread 514 is displayed, ready to be edited. In response to the user pressing an import button 512 to import image data as material for album data, a file select dialog (not shown) is displayed. By selecting image data using the file select dialog, the user imports the image data into the editing app.

The image data imported into the editing app is, for example, displayed in a list 506 as a thumbnail showing the image data. By the user dragging and dropping a thumbnail image corresponding to desired image data onto the two-page spread 514, an image corresponding to the thumbnail image thus dragged and dropped is placed on the two-page spread 514 as an image object. Besides an image object, text data corresponding to, e.g., a character string inputted by a user can also be placed on the two-page spread 514 as a text object. Hereafter, image objects, text objects, and the like, placed on a two-page spread are collectively referred to as objects. A user edits each two-page spread to create album data. In a case when the user orders an album, the album data created by the information processing apparatus 100 is uploaded to the external server 15 via the communication network 19. In a case when the uploaded album data is printable, the external server 15 outputs print data based on the album data to the external printer 16 to cause the external printer 16 to print the print data.

A description is given below of a method for inputting an attribute value of an attribute other than the position and size of an object, which is a part of a method for editing a two-page spread using the editing app operating in the information processing apparatus 100 (here after, an attribute other than the position and size of an object is referred to as a "non-position attribute," and an attribute value of a non-position attribute is referred to as a "non-position attribute value"). A method described in Embodiment 1 as an example is for inputting a rotation angle of an object to rotate the object on a plane corresponding to a two-page spread, the rotation angle being one of non-position attribute values for the object. Note that an attribute value of a position or size attribute of an object can be inputted using the object snapping method described in, for example, Japanese Patent Laid-Open No. 2021-026705 (here after, a position or size attribute of an object is referred to as a "position attribute," and an attribute value of a position attribute is referred to as a "position attribute value"). Thus, a method for inputting a position attribute value is not described herein. Also, the following description assumes that four objects 516-1, 516-2, 516-3, and 516-4, all of them being image objects, have already been placed on the two-page spread 514 as objects 516.

A scenario where a user rotates the object 516-1 is described. The user uses the operation input apparatus 12 to move a mouse cursor 515 displayed on the display output apparatus 11 onto the object 516-1 to be rotated. The operation obtaining unit 110 obtains operation information outputted from the operation input apparatus 12. The operation information obtained by the operation obtaining unit 110 is reported from the CPU 411 to the editing app. The output controlling unit 190 generates a display image such as the edit screen 501, or the like, exemplified in FIG. 5 and outputs the display image as display information to the display output apparatus 11, thereby displaying the display image on the display output apparatus 11. Note that the output controlling unit 190 is processed by the CPU 411 in parallel with the other units in the information processing apparatus 100 than the output controlling unit 190. The output controlling unit 190 thus generates a display image showing, e.g., the state of the editing app in accordance with the frame rate supported by the display output apparatus 11 and outputs the generated display image as display information. With the mouse cursor 515 having been moved onto the object 516-1, the user performs, e.g., a mouse click operation (here after referred to as a "mouse click") or a press operation of a predefined button on the keyboard, such as the space key. As a result of this operation, the object 516-1 to be rotated is selected. In the following description, a mouse click is used as an example user operation.

Figure 6:
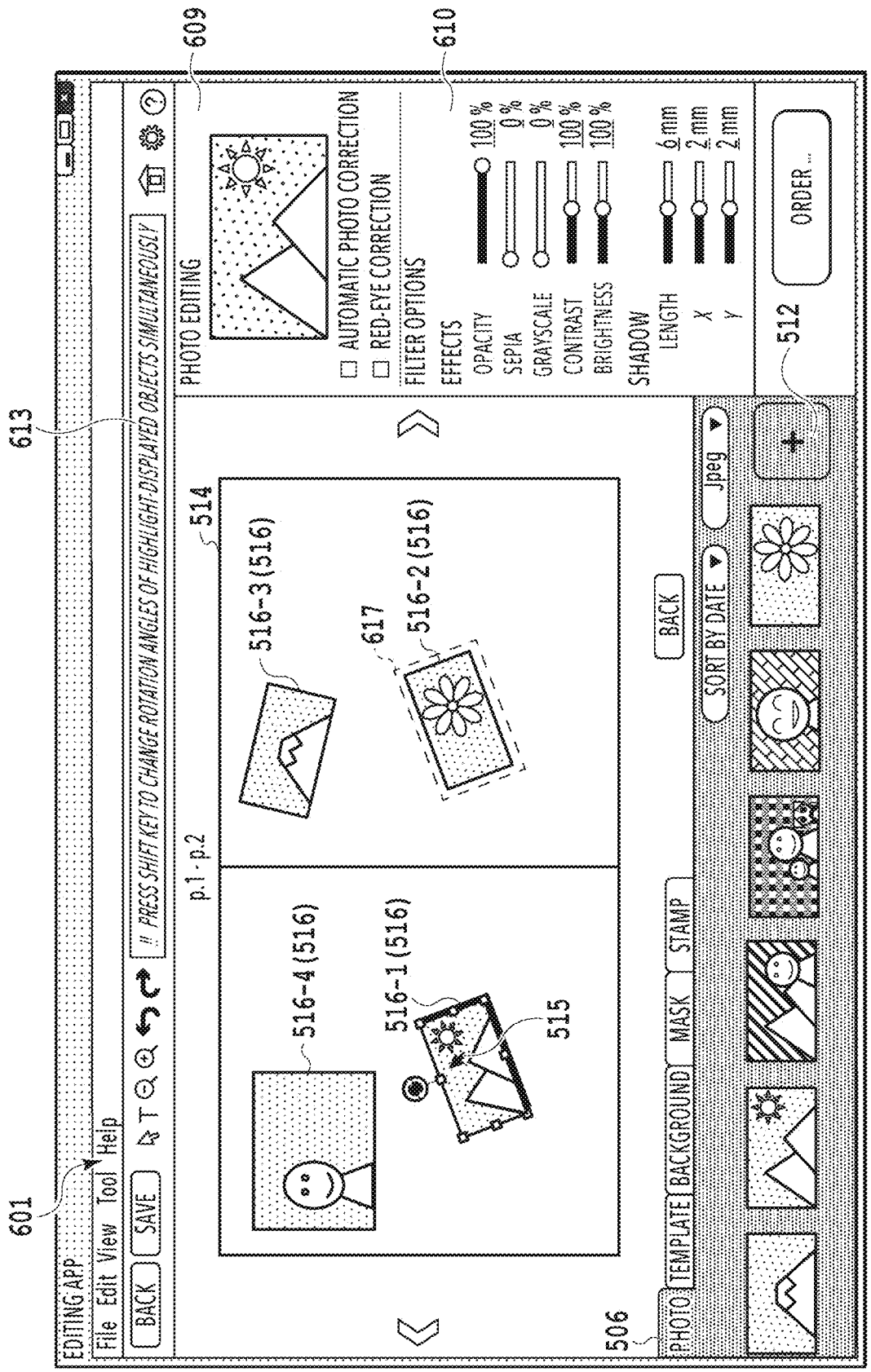
FIG. 6 is a diagram showing an example of an edit screen in which an object to be rotated is being selected.

FIG. 6 is a diagram showing an example of what the edit screen looks like in a case when the object 516-1 to be rotated is being selected in the information processing apparatus 100 according to Embodiment 1. In other words, the edit screen shown in FIG. 6 is a display image generated by the output controlling unit 190 to correspond to the state of the editing app where the object 516-1 to be rotated is being selected. The edit screen shown in FIG. 6 includes an image editing control panel region 610 for setting non-position attribute values for the object 516-1 being selected. As examples of non-position attributes of the object 516-1, the edit screen shown in FIG. 6 shows opacity, contrast, brightness, the length of a drop shadow (here after referred to as "shadow"), and the like. Note that components in FIG. 6 similar to those on the edit screen shown in FIG. 5 are denoted by the same reference numerals as those used in FIG. 5 to omit their descriptions.

Figure 7A:
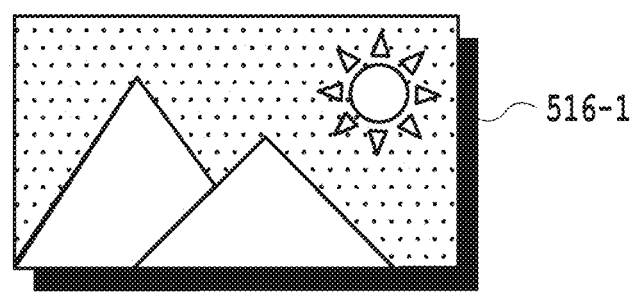
FIG. 7A is an enlarged view of an object not being selected as a rotation target.
Figure 7B:
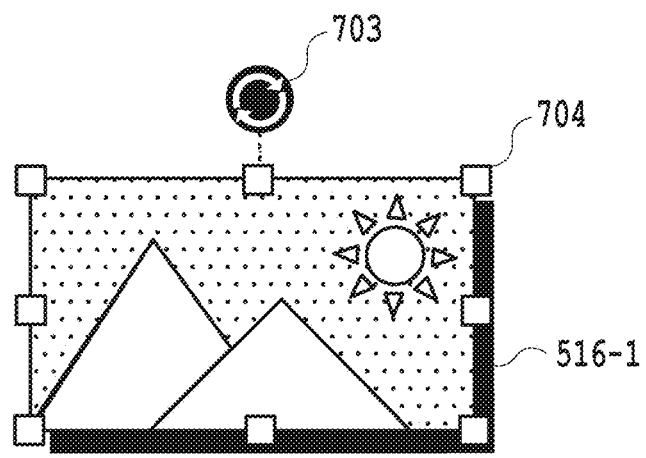
FIG. 7B is an enlarged view of an object being selected as a rotation target.

FIGS. 7A and 7B are each an enlarged view of the object 516-1. Specifically, FIG. 7A is an enlarged view of the object 516-1 not being selected as a rotation target, and FIG. 7B is an enlarged view of the object 516-1 being selected as a rotation target. Once the object 516-1 is selected as a rotation target, as shown in FIG. 7B, a scale-up/down icon 704 used to perform an operation of changing the size of the object 516-1 and a rotation icon 703 used to perform an operation of rotating the object 516-1 are displayed. Using the operation input apparatus 12, the user performs, for example, a mouse dragging operation with respect to the scale-up/down icon 704 (the drag operation is to press down a mouse button with the mouse cursor located over an operation target and move the mouse cursor with the mouse button being held down). This operation allows the user to change the size of the object 516-1 to any size. Also, using the operation input apparatus 12, the user performs, for example, a mouse dragging operation with respect to the rotation icon 703. This operation allows the user to change the rotation angle of the object 516-1 to any rotation angle by rotating the object 516-1. The rotation angle of an object is a non-position attribute value of the rotation attribute of the object, which is one of non-position attributes. Here after, an object on which an operation of changing a non-position attribute value is being performed is referred to as a change object, and objects other than the change object are referred to as different objects.

Figure 8A:
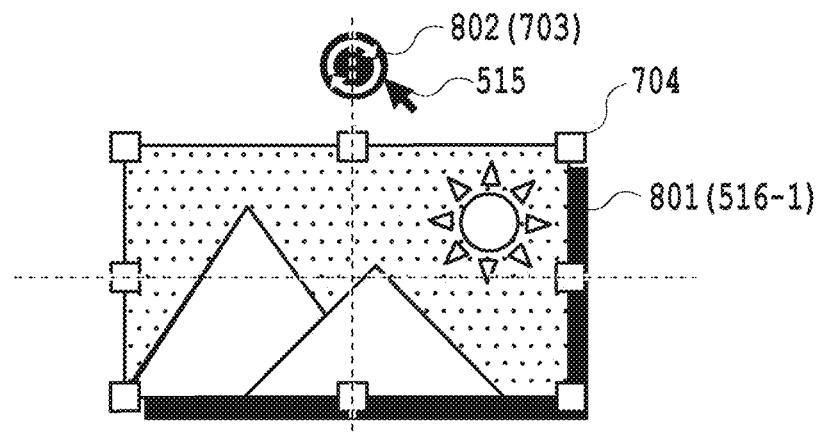
FIG. 8A is a diagram showing an example of an object before a rotation operation.
Figure 8B:
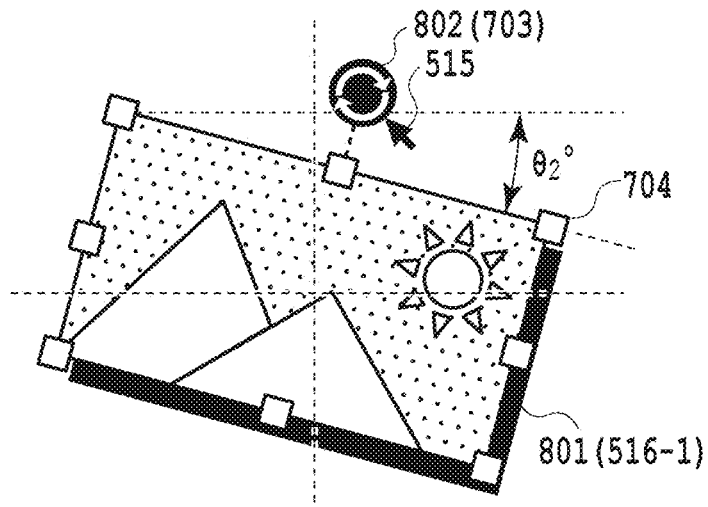
FIG. 8B is a diagram showing an example of an object during a rotation operation.
Figure 8C:
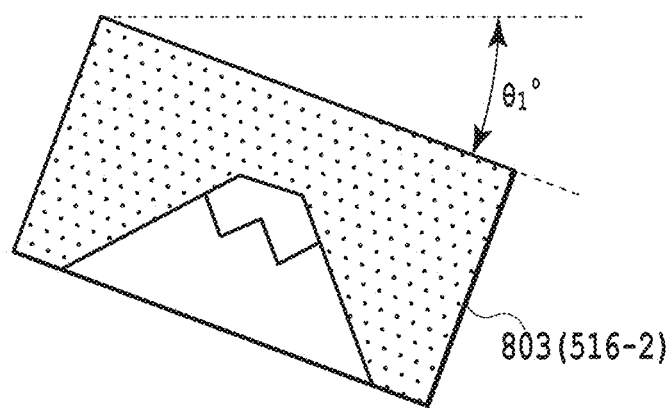
FIG. 8C is a diagram showing an example of a different object.

With reference to FIGS. 8A to 8C, processing performed by the information processing apparatus 100 in changing the rotation angle of an object 801 is described. FIG. 8A is a diagram showing an example of the object 801 before a rotation operation is performed (for example, an object corresponding to the object 516-1 in FIG. 5), and FIG. 8B is a diagram showing an example of the object 801 during a rotation operation. As shown in FIGS. 8A and 8B, the position of the center point of the object 801 and the positional relation between the object 801 and a rotation icon 802 associated with the object 801 are the same before, during, and after a rotation operation. Also, with R being the distance between the center point of the object 801 and the center point of the rotation icon 802, the distance R does not change from the start to the end of the mouse drag of the rotation icon 802. Thus, the rotation icon 802 moves on the circumference of a circle having a radius R as the distance to the center point of the object 801. Thus, the user can input any angle as the rotation angle of the object 801 by moving the rotation icon 802 using a mouse drag operation.

Specifically, the operation obtaining unit 110 obtains operation information corresponding to a user's mouse drag operation on the rotation icon 802. The operation information corresponding to a mouse drag operation corresponds to an operation of continuously changing the operation position of the rotation icon 802. The attribute value changing unit 120 changes a non-position attribute value for an operation-target object in accordance with a change in the operation position corresponding to the operation information obtained by the operation obtaining unit 110. In addition to changing a non-position attribute value, the attribute value changing unit 120 can change an attribute value of a position attribute of the operation-target object (here after referred to as a "position attribute value") in accordance with a change in the operation position. For example, the object snapping method described in Japanese Patent Laid-Open No. 2021-026705 can be used to change a position attribute value in accordance with a change in the operation position. As described above, Embodiment 1 describes, as an example, a mode where the attribute value changing unit 120 changes rotation angle in accordance with a change in the operation position. Also, the following description uses coordinates (x, y) to represent the position of any point, with the horizontal direction and the vertical direction of the edit screen shown in FIG. 5 or 6 being the X direction and the Y direction, respectively, and the upper left corner of the edit screen being the origin.

A rotation angle θ of the object 801 can be calculated by the following Formula (1):

$$\theta = \arctan((y1-y0)/(x1-x0)) - 90°, \qquad \text{Formula (1)}$$

where coordinates (x1, y1) indicate the position of the center point of the rotation icon 802 and coordinates (x0, y0) indicate the position of the center point of the object 801. Note that θ=0° in a case when (x1−x0)=0.

Next, a description is given of a method for changing the rotation angle of the object 801, or, more specifically, for changing the rotation angle of the object 801 as a change object to a value matching the rotation angle of a different object.

As an example, the description is for a case when a user drags the rotation icon 802 to rotate the object 801 from the state of the object 801 shown in FIG. 8A to the state of the object 801 shown in FIG. 8B. The object 801 shown in FIG. 8B is what the object 801 shown in FIG. 8A looks like after being rotated by $\theta_2$. FIG. 8C is a diagram showing an example of a different object 803 placed on the same two-page spread as the object 801 (for example, an object corresponding to the object 516-2 shown in FIG. 5). As shown in FIG. 8C, a rotation angle $\theta_1$ is set to the different object 803.

The operation determining unit 130 determines whether operation information obtained by the operation obtaining unit 110 indicates that an operation of changing the rotation angle of the object 801 is being performed. Specifically, the operation determining unit 130 determines whether the user is currently dragging the rotation icon 802 associated with the object 801. While an operation of changing the rotation angle of the object 801 is being performed, the attribute value extracting unit 140 extracts a non-position attribute value for the different object 803, the non-position attribute value being of the same attribute as the non-position attribute value on which the change operation is being performed. The non-position attribute value on which the change operation is being performed is the rotation angle of the object 801, and, since the rotation angle of the different object 803 is 01, the non-position attribute value extracted by the attribute value extracting unit 140 is 01. The attribute value determining unit 150 determines whether 02, which is the current value of the rotation angle of the object 801 on which the change operation is being performed (i.e., the change object), is a value within a range predefined based on $\theta_1$ extracted by the attribute value extracting unit 140. Specifically, for example, in a case when the range predefined based on $\theta_1$ is $\theta_1 \pm d°$, the attribute value determining unit 150 determines whether $\theta_2$, which is the current value of the rotation angle of the object 801, satisfies the condition indicated by the following Formula (2):

$$\theta_1 - d° \leq \theta_2 \leq \theta_1 + d°. \quad \text{Formula (2)}$$

In the above formula, d is any real number from, for example, 0.5 to 2.0. Note that d is not limited to any real number from 0.5 to 2.0, and may be a value determined by the size, display magnification, or the like, of the object 801 which is a change object. In a case when the attribute value determining unit 150 determines that the condition indicated by Formula (2) is satisfied, the attribute value changing unit 120 changes the current value of the rotation angle of the object 801 from $\theta_2$ to $\theta_1$.

The above configuration allows a user to adjust the rotation angle of the object 801 to the rotation angle of the different object 803 easily without having to adjust the rotation angle $\theta_2$ of the object 801 strictly to the rotation angle $\theta_1$ of the different object 803. As a result, the user can easily edit or create a layout providing a sense of unity in design by using the information processing apparatus 100.

The internal operation of the information processing apparatus 100 is described in more detail below. At the time a user has selected the object 516-1 as a target to change rotation angle, the edit screen shown in FIG. 6 is being displayed on the display output apparatus 11. The time at which an operation of dragging the rotation icon for the object 516-1 is started with the edit screen shown in FIG. 6 being displayed on the display output apparatus 11 is the time at which changing of the rotation angle of the object 516-1 is started. The editing app operating in the information processing apparatus 100 is configured by, for example, an event-driven framework. Operation information indicating moving of the rotation icon associated with a change object is reported as a mouse move event from the CPU 411 to the attribute value changing unit 120 and the operation determining unit 130. The mouse move event is assigned to processing performed by the attribute value changing unit 120 to move a rotation icon, or, specifically, processing to move the rotation icon on the circumference of a circle having the center point of the change object as its center point and having the radius R. Also, this mouse move event is assigned to processing performed by the attribute value changing unit 120 to change the rotation angle of the change object associated with the rotation icon. Details of the processing for changing a position attribute value for a change object will be described in other embodiments.

Examples of non-position attributes of the object 516-1 include "opacity," filter levels such as "sepia" or "grayscale," "contrast," "brightness," and the "length," "X direction," and "Y direction" of "shadow," as exemplified in FIG. 6. An attribute value of each of these non-position attributes (a non-position attribute value) is input and set by a user operation of dragging the slider knob icon of the corresponding slider controller, thereby changing the position of the slider knob icon. A mouse move event occurs in the event where the slider knob icon is moved, and this mouse move event is assigned to processing for changing the corresponding non-position attribute value. The process flow of the processing for changing each of the above non-position attribute values is the same as the process flow of rotation angle changing processing. Thus, the following describes the process flow of the rotation angle changing processing as an example process flow of the non-position attribute value changing processing.

Figure 9:
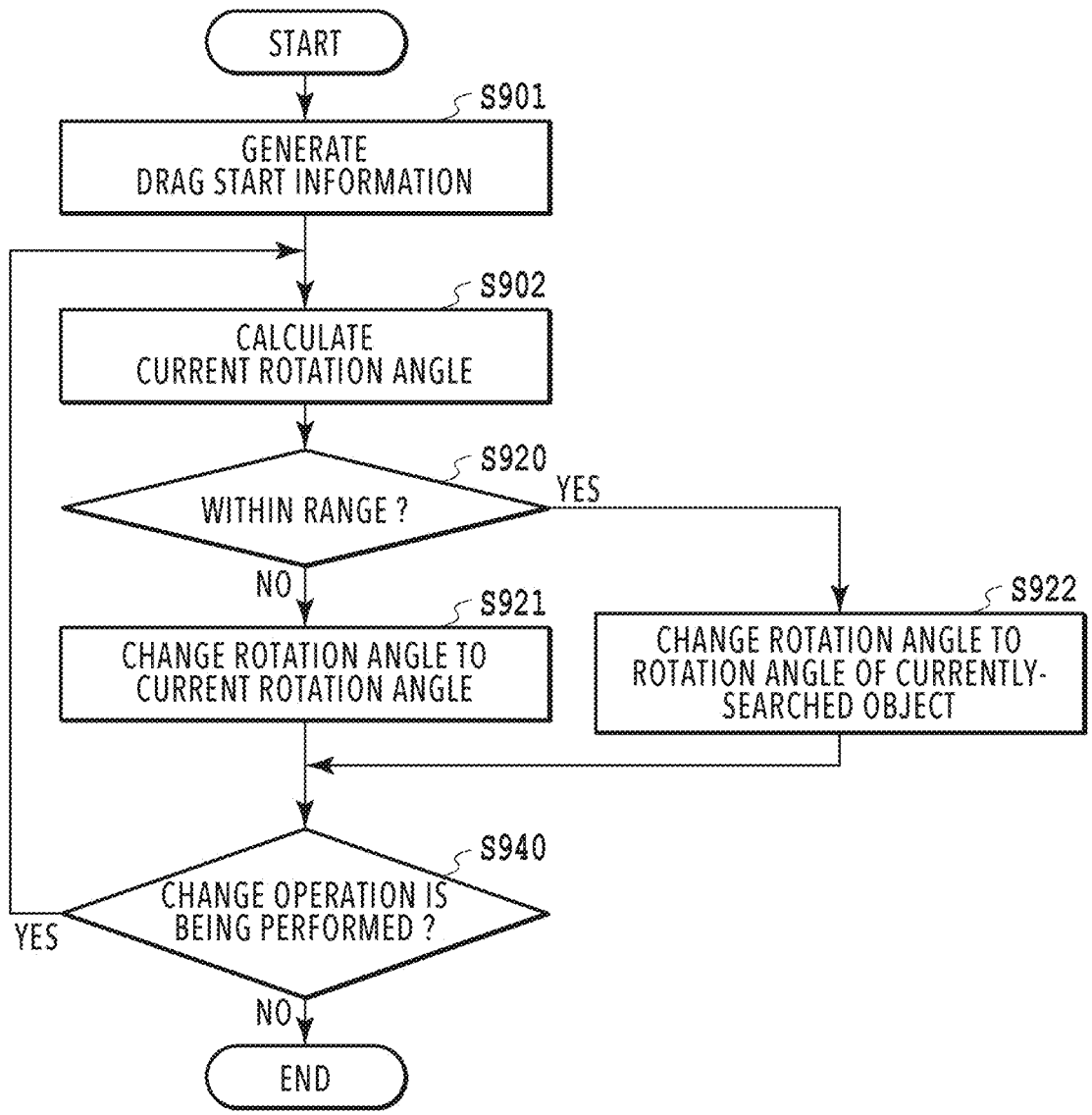
FIG. 9 is a flowchart showing an example of an operation for performing non-position attribute value changing processing.

With reference to FIG. 9, the process flow of the non-position attribute value changing processing is described. FIG. 9 is a flowchart showing an example of how the information processing apparatus 100 according to Embodiment 1 operates to perform the non-position attribute value changing processing. The information processing apparatus 100 repeats the processing in the flowchart shown in FIG. 9 every time the information processing apparatus 100 obtains operation information corresponding to a user operation of changing a non-position attribute value. Note that the flowchart shown in FIG. 9 is carried out after the operation determining unit 130 determines that operation information obtained by the operation obtaining unit 110 corresponds to a user operation of starting to move the rotation icon, such as to drag the rotation icon. In the following description, the letter "S" denotes Step.

First, in S901, the attribute value changing unit 120 generates, as drag start information, information representative of the state at the time of the start of the rotation icon moving processing. The drag start information is retained from the start to the end of the rotation icon moving processing.

FIG. 10A is a diagram showing an example of items in the drag start information according to Embodiment 1. As shown in FIG. 10A, the drag start information includes information indicating, for example, the position of the mouse cursor at the time dragging of the rotation icon is started and also the position, width, height, and rotation angle of the change object associated with the rotation icon. The drag start information also includes, as shown in FIG. 10A, information indicating the center coordinates of the rotation icon at the time dragging of the rotation icon is started. The drag start information also includes, as shown in FIG. 10A, information (pointer information) for accessing object information including attribute values of position attributes and non-position attributes of the change object associated with the rotation icon on which the moving processing has been started. Note that the items in the drag start information shown in FIG. 10A are an example for a case when the change object associated with the rotation icon on which the moving processing has been started is an image object, and the items in the drag start information are not limited to the above.

FIG. 10B is a diagram showing an example of items in object information according to Embodiment 1. As shown in FIG. 10B, for example, the object information is defined as an object structure, and attribute values of position attributes and non-position attributes are stored in corresponding fields in the object structure. As shown in FIG. 10B, the object information includes, e.g., information indicating, for example, the position, size, rotation angle, opacity, and filter levels of an object and the size of a circumscribing rectangle containing the object. Note that the items in the object information shown in FIG. 10B are an example for a case when the object is an image object, and the items in the object information are not limited to the above. Also, descriptions will be given in other embodiments regarding the information indicating the size of a circumscribing rectangle, a highlight display flag, and information indicating a b-value list that are included in the object information shown in FIG. 10B.

Pieces of object information corresponding to the respective objects placed on a two-page spread are managed using, for example, an object information array, as exemplified in FIG. 10B. FIG. 10C will be described in another embodiment. Once the rotation icon moving processing is started, the attribute value changing unit 120 generates drag start information using the position, size, rotation angle, and the like, of the object included in the object information and retains the drag start information.

After S901, in S902, the attribute value changing unit 120 calculates the current rotation angle. Specifically, first, the attribute value changing unit 120 calculates the difference between the current mouse position and the mouse position at the time of the start of the rotation icon moving processing, which is included in the drag start information. Next, the attribute value changing unit 120 calculates the current center coordinates of the rotation icon by adding the above difference to the center coordinates of the rotation icon at the time of the start of the rotation icon moving processing, which is included in the drag start information. Next, the attribute value changing unit 120 calculates the center coordinates of the change object using the position and the size of the change object, which is an object associated with the rotation icon on which the moving processing has been started. Next, the attribute value changing unit 120 calculates the current rotation angle by using Formula (1) given above. Note that, in a case of changing a non-position attribute value using a slider controller like the non-position attributes exemplified in the control panel region 610 in FIG. 6, the position of the slider knob icon is associated with a non-position attribute value, and therefore, the above computation is unnecessary.

Figure 11:
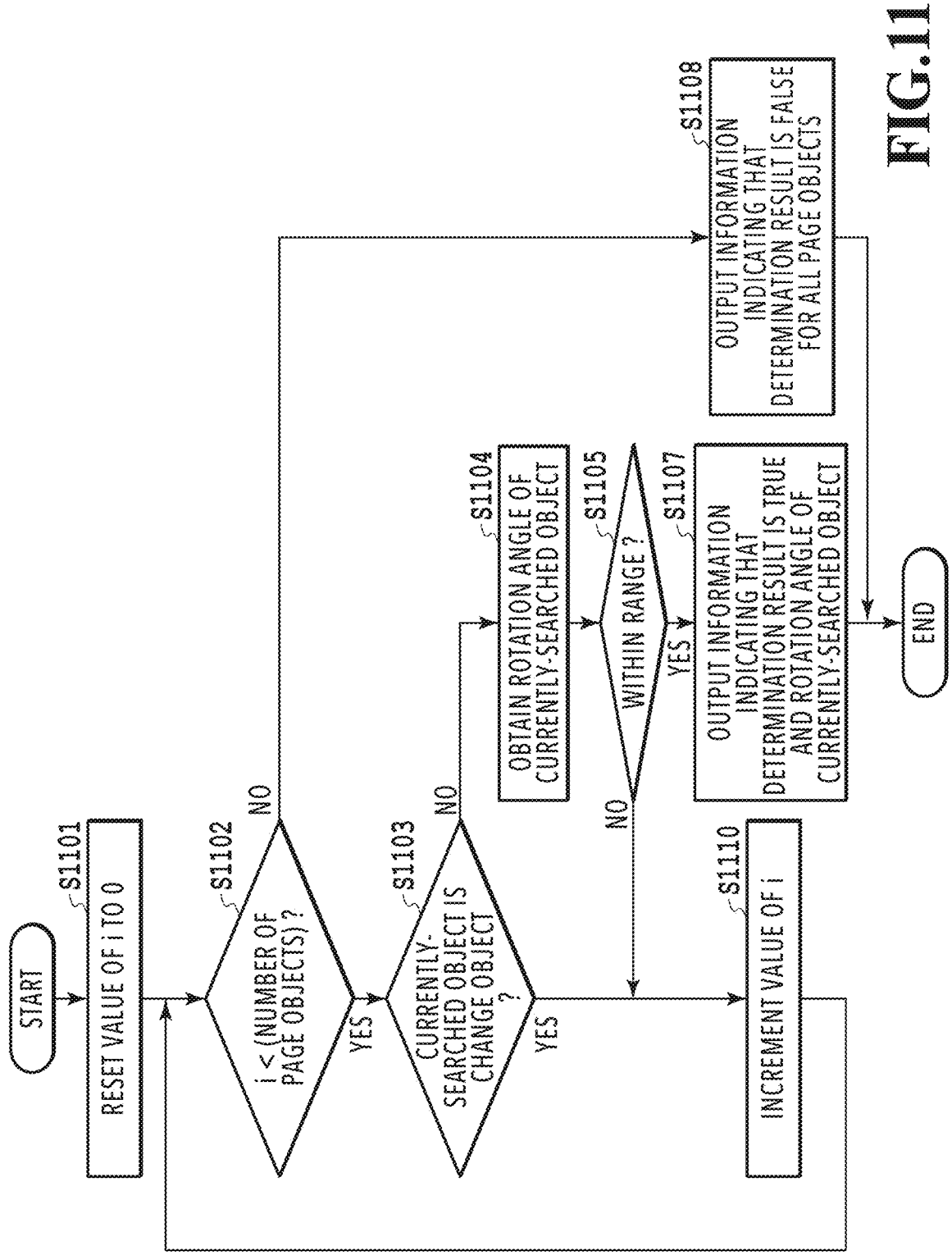
FIG. 11 is a flowchart showing an example process flow of processing of S920.

After S902, in S920, the attribute value extracting unit 140 extracts the rotation angle of a different object, and the attribute value determining unit 150 determines whether the current value of the rotation angle of the change object is within a range predefined based on the rotation angle of the different object. Details of this processing of S920 are described with reference to FIG. 11. FIG. 11 is a flowchart showing an example process flow of the processing of S920 shown in FIG. 9. In S1101, the attribute value extracting unit 140 resets the value of a loop index i to zero. Next, in S1102, the attribute value extracting unit 140 determines whether the value of the loop index i is less than the number of objects placed on the same two-page spread as the change object (such objects are hereinafter referred to as "page objects"). If a result of the determination by the attribute value extracting unit 140 in S1102 is true, in S1103 the attribute value extracting unit 140 determines whether the page object corresponding to the value of the loop index i (hereinafter referred to as a "currently-searched object") is the change object.

If a result of the determination by the attribute value extracting unit 140 in S1103 is true, in S1110, the attribute value extracting unit 140 increments the value of the loop index i. After S1110, the information processing apparatus 100 proceeds back to S1102 and executes the processing of S1102. If a result of the determination by the attribute value extracting unit 140 in S1103 is false, in S1104, the attribute value extracting unit 140 extracts the rotation angle of the currently-searched object. After S1104, in S1105, the attribute value determining unit 150 determines whether the current value of the rotation angle of the change object is a value within a range predefined based on the rotation angle of the currently-searched object extracted by the attribute value extracting unit 140. Specifically, for example, the attribute value determining unit 150 calculates the difference between the rotation angle of the change object and the rotation angle of the currently-searched object and determines whether the difference is a value within a predefined range. The predefined range may be determined in advance for each type of non-position attributes or for each type of user operations of changing a non-position attribute value, or may be specified in advance by a user operation. Also, the predefined range may be a prescribed value hardcoded into the editing app, or may be obtained by the editing app by reading information indicative of the predefined range stored as an electric file.

If a result of the determination by the attribute value determining unit 150 in S1105 is true, in S1107 the attribute value determining unit 150 outputs information indicating that the determination result is true and the rotation angle of the currently-searched object. After S1107, the information processing apparatus 100 ends the flowchart shown in FIG. 11 and executes processing of S922 shown in FIG. 9. If a result of the determination by the attribute value determining unit 150 in S1105 is false, the information processing apparatus 100 executes the processing of S1110. The processing of S1110 has already been described and is therefore not described here. If a result of the determination by the attribute value extracting unit 140 in S1102 is false, in S1108, the attribute value determining unit 150 outputs information indicating that the determination result in S1105 is false for all the page objects other than the change object. After S1108, the information processing apparatus 100 ends the flowchart shown in FIG. 11 and executes processing of S921 shown in FIG. 9.

Referring back to FIG. 9, processing in and after S921 is described. If the determination result in S920 is false, i.e., if the determination result in S1102 shown in FIG. 11 is false, the attribute value changing unit 120 executes processing of S921. Specifically, in S921, the attribute value changing unit 120 changes the rotation angle of the change object to the current rotation angle calculated by the attribute value changing unit 120 in S902. More specifically, the attribute value changing unit 120 changes the rotation angle of the change object by copying the current rotation angle calculated by the attribute value changing unit 120 in S902 to the rotation angle included in the object information corresponding to the change object. After S921, the information processing apparatus 100 executes processing of S940. If the determination result in S920 is true, i.e., the determination result in S1105 shown in FIG. 11 is true, the attribute value changing unit 120 executes processing of S922. Specifically, in S922, the attribute value changing unit 120 changes the rotation angle of the change object to the rotation angle of the currently-searched object outputted from the attribute value determining unit 150 in S1107 shown in FIG. 11. More specifically, the attribute value changing unit 120 changes the rotation angle of the change object by copying the rotation angle of the currently-searched object outputted from the attribute value determining unit 150 in S1107 shown in FIG. 11 to the rotation angle included in the object information corresponding to the change object. After S922, the information processing apparatus 100 executes processing of S940.

In S940, the operation determining unit 130 determines whether operation information obtained by the operation obtaining unit 110 indicates that the operation of changing the rotation angle of the change object is being performed. Specifically, for example, the operation determining unit 130 determines whether the operation information obtained by the operation obtaining unit 110 indicates that the rotation icon on which the moving processing has been started is still being dragged. If the determination result in S940 is true, the information processing apparatus 100 proceeds back to S902 and executes the processing of S902. If the determination result in S940 is false, the information processing apparatus 100 ends the processing in the flowchart shown in FIG. 9.

By using the information processing apparatus 100 thus configured, a user can easily input a non-position attribute value for an operation-target object such that the non-position attribute value matches a non-position attribute value for a different object. As a result, by using the information processing apparatus 100, a user can easily edit or create a layout providing a sense of unity in design. In particular, in a case when the information processing apparatus 100 is applied to the album ordering system 10, a user can easily edit or create album data for use to create a photo album having layouts providing a sense of unity in design by using the information processing apparatus 100.

Second Embodiment

Figure 12:
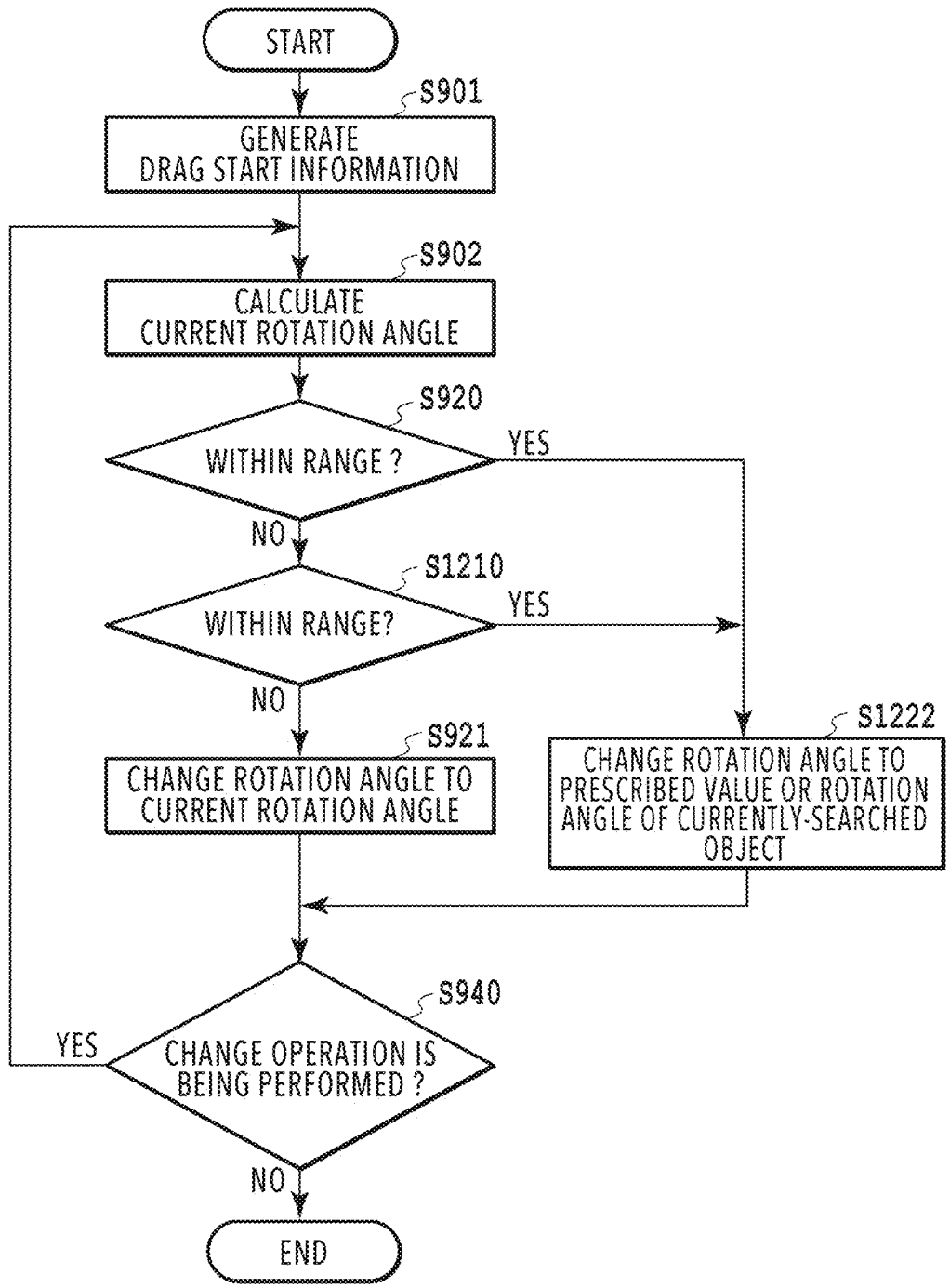
FIG. 12 is a flowchart showing an example of operation for performing non-position attribute value changing processing.
Figure 13:
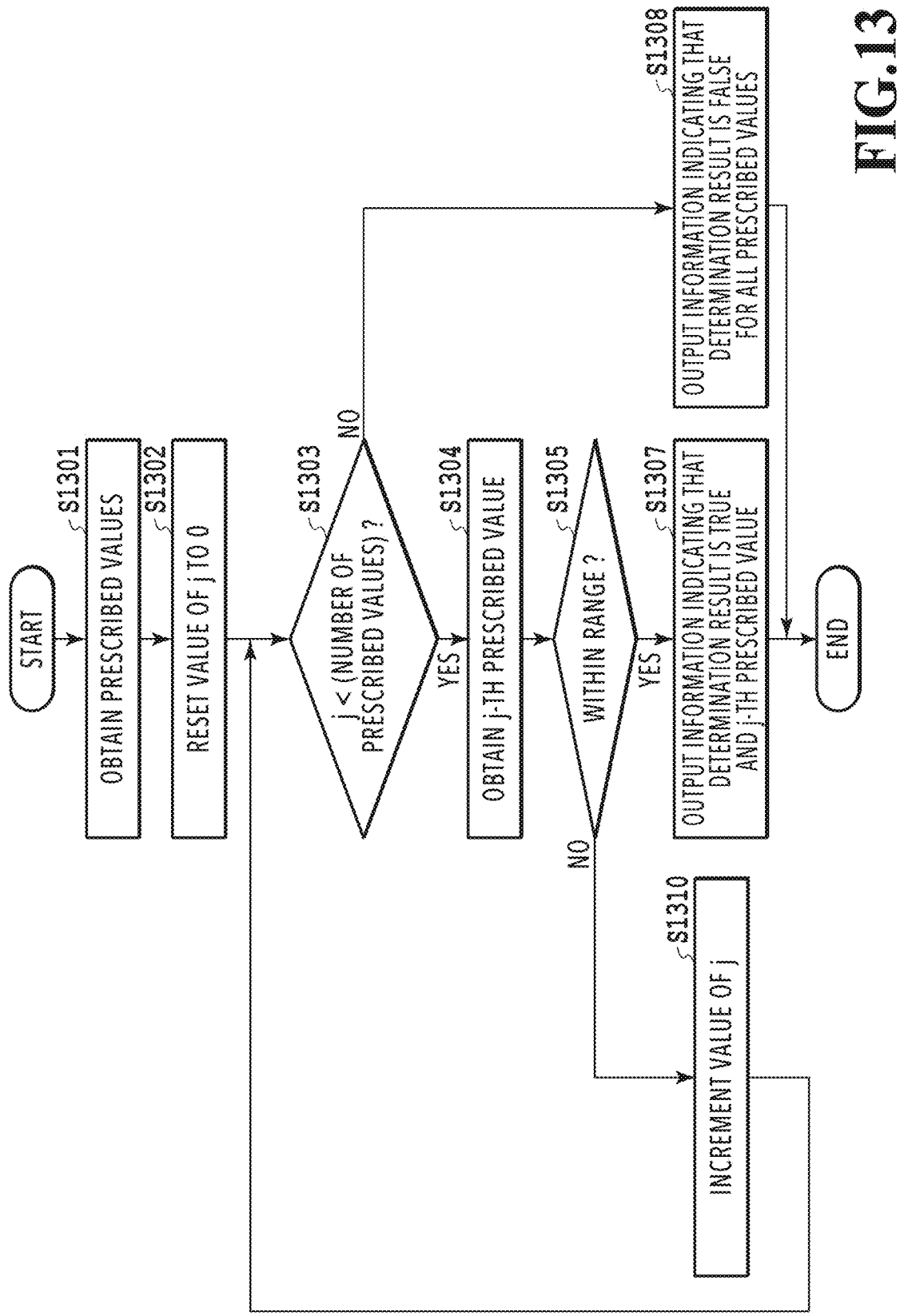
FIG. 13 is a flowchart showing an example process flow of processing of S1210.
Figure 14:
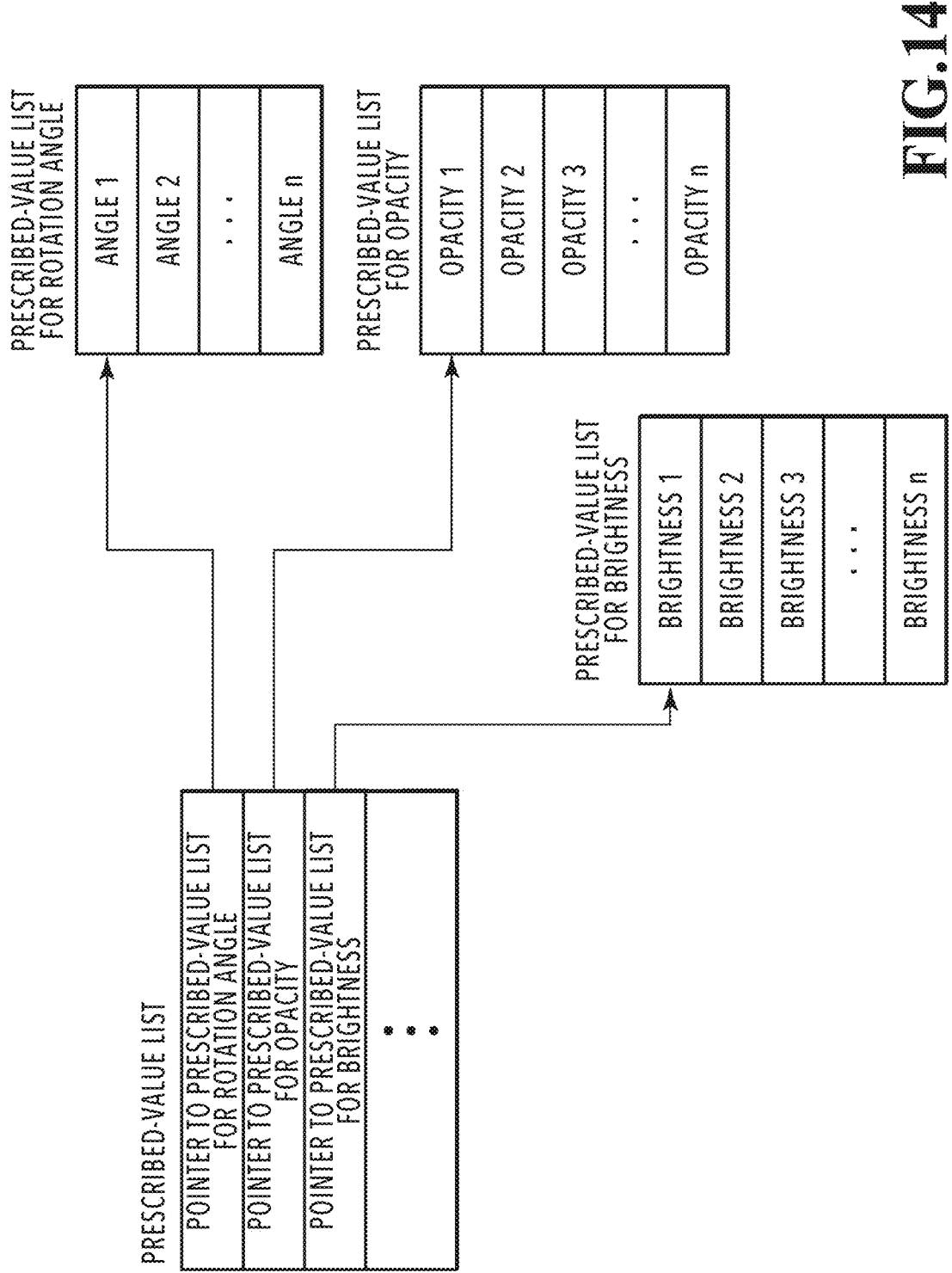
FIG. 14 is a diagram showing an example of a prescribed-value list.

With reference to FIGS. 12 to 14, an information processing apparatus 100 according to Embodiment 2 is described. The description assumes that the information processing apparatus 100 according to Embodiment 2 is applied to the album ordering system 10. The information processing apparatus 100 according to Embodiment 2 includes an operation obtaining unit 110, an attribute value changing unit 120, an operation determining unit 130, an attribute value extracting unit 140, an attribute value determining unit 150, and an output controlling unit 190. Note that the attribute value changing unit 120 and the attribute value determining unit 150 according to Embodiment 2 are what the attribute value changing unit 120 and the attribute value determining unit 150 in the information processing apparatus 100 according to Embodiment 1 are partially modified in function.

At the initial stage of album data creation or at the initial stage of two-page spread editing, there may be no other object (different object) placed on the two-page spread than an operation-target object (a change object). In such a case, with the non-position attribute value inputting method described in Embodiment 1, it may be difficult for a user to determine to which value a non-position attribute value should be changed because there is no non-position attribute value to which to match the non-position attribute value. The information processing apparatus 100 according to Embodiment 2 can solve such a problem. Note that the description is given assuming that the information processing apparatus 100 according to Embodiment 2 is configured by the hardware exemplified in FIG. 4, like the information processing apparatus 100 according to Embodiment 1. The description also assumes that the processing by the units in the information processing apparatus 100 according to Embodiment 2 is implemented by the editing app installed to the information processing apparatus 100, like the information processing apparatus 100 according to Embodiment 1. As an example of a method for inputting a non-position attribute value using the editing app operating in the information processing apparatus 100 according to Embodiment 2, the following describes a method for inputting the rotation angle of an object placed on a two-page spread. Note that the following description omits descriptions for the configurations and processing that are the same as those in Embodiment 1.

The attribute value determining unit 150 according to Embodiment 1 determines whether the current value of the rotation angle of a change object is a value within a range predefined based on the rotation angle of a different object. By contrast, the attribute value determining unit 150 according to Embodiment 2 not only performs the same determination as that performed by the attribute value determining unit 150 according to Embodiment 1, but also determines whether the current value of the rotation angle of the change object is a value within a range predefined based on a predefined prescribed value. The predefined prescribed value (here after simply referred to as a "prescribed value") is, in a case when a user operation is an operation of rotating an object, 30°, 45°, 60°, 90°, 120°, 115°, 150°, 180°, 210°, 225°, 240°, 270°, 300°, 315°, 330°, or the like.

Also, the attribute value changing unit 120 according to Embodiment 1 changes the rotation angle of a change object to a rotation angle extracted by the attribute value extracting unit 140 in a case when a result of the determination by the attribute value determining unit 150 according to Embodiment 1 is true. By contrast, the attribute value changing unit 120 according to Embodiment 2 performs the following processing in addition to the same processing as that performed by the attribute value determining unit 150 according to Embodiment 1. In a case when the attribute value determining unit 150 determines that the current value of the rotation angle of the change object is a value within a range predefined based on the prescribed value, the attribute value changing unit 120 according to Embodiment 2 changes the rotation angle of the change object to the prescribed value.

With reference to FIG. 12, a description is given of the process flow of non-position attribute value changing processing by the information processing apparatus 100 according to Embodiment 2. FIG. 12 is a flowchart showing an example of how the information processing apparatus 100 according to Embodiment 2 operates in performing the non-position attribute value changing processing. The flowchart shown in FIG. 12 has processing of S1210 added between the processing of S920 and the processing of S921 in the flowchart shown in FIG. 9, and the processing of S922 shown in FIG. 9 is changed to S1222. Note that the processing of S920 and the processing of S1210 may be performed in any order.

The information processing apparatus 100 first executes the processing of S901 to the processing of S920. If the determination result in S920 is false, in S1210, the attribute value determining unit 150 determines whether the current value of the rotation angle of the change object is a value within ranges predefined based on prescribed values. With reference to FIG. 13, details of the processing of S1210 are described. FIG. 13 is a flowchart showing an example process flow of the processing of S1210 shown in FIG. 12. First, in S1301, the attribute value determining unit 150 obtains prescribed values. The prescribed values obtained by the attribute value determining unit 150 are, for example, stored as a prescribed-value list in the RAM 413 in the information processing apparatus 100 upon the activation of the editing app. FIG. 14 is a diagram showing an example of the prescribed-value list according to Embodiment 2. From the prescribed-value lists corresponding to the respective non-position attributes shown in FIG. 14, the attribute value determining unit 150 obtains the prescribed-value list for the same attribute as the non-position attribute value on which the change operation is being performed. In Embodiment 2, as an example, the non-position attribute value on which the change operation is being performed is a rotation angle, and thus the attribute value determining unit 150 obtains a prescribed-value list for the rotation angle, thereby obtaining prescribed values. The following description assumes that, as an example, the prescribed-value list for rotation angle has four prescribed values, which are, from the top of the list, 0°, 30°, 45°, and 60°.

Next, in S1302, the attribute value determining unit 150 resets the value of a loop index j to zero. Next, in S1303, the attribute value determining unit 150 determines whether the value of the loop index j is less than the number of prescribed values in the prescribed-value list obtained by the attribute value determining unit 150. If the result of the determined by the attribute value determining unit 150 in S1303 is true, in S1304, the attribute value determining unit 150 obtains the j-th prescribed value in the prescribed-value list obtained by the attribute value determining unit 150. After S1304, in S1305, the attribute value determining unit 150 determines whether the current value of the rotation angle of the change object is a value within a range predefined based on the j-th prescribed value in the prescribed-value list. Specifically, for example, the attribute value determining unit 150 calculates the difference between the rotation angle of the change object and the j-th prescribed value in the prescribed-value list and determines whether the difference is a value within the predefined range. A description of the predefined range has already been given and is, therefore, not given here.

If a result of the determination by the attribute value determining unit 150 in S1305 is true, in S1307, the attribute value determining unit 150 outputs information indicating that the determination result is true and the j-th prescribed value in the prescribed-value list. After S1307, the information processing apparatus 100 ends the flowchart shown in FIG. 13 and executes processing of S1222 shown in FIG. 12. If the result of the determination by the attribute value determining unit 150 in S1305 is false, in S1310, the attribute value determining unit 150 increments the value of loop index j. After S1310, the information processing apparatus 100 proceeds back to S1303 and executes the processing of S1303. If a result of the determination by the attribute value determining unit 150 in S1303 is false, in S1308, the attribute value determining unit 150 outputs information indicating that the determination result in S1305 is false for all the prescribed values in the prescribed-value list. After S1308, the information processing apparatus 100 ends the flowchart shown in FIG. 13 and executes the processing of S921 shown in FIG. 12.

Referring back to FIG. 12, processing after S920 is described. If the determination result in S1210 is false, i.e., if the determination result in S1303 shown in FIG. 13 is false, the information processing apparatus 100 executes the processing of S921 and the processing of S940 sequentially. If the determination result in S1210 is true, i.e., the determination result in S1305 shown in FIG. 13 is true, the attribute value changing unit 120 executes processing of S1222. Specifically, in S1222, the attribute value changing unit 120 changes the rotation angle of the change object to the prescribed value outputted from the attribute value determining unit 150 in S1307 shown in FIG. 13. More specifically, the attribute value changing unit 120 changes the rotation angle of the change object by copying the j-th prescribed value in the prescribed-value list for rotation angle shown in FIG. 14 to the rotation angle included in the object information corresponding to the change object. If the determination result in S920 is true, the processing of S1222 is the same as the processing of S922 shown in FIG. 9 and is, therefore, not described here. After S1222, the information processing apparatus 100 executes the processing of S940.

With the configuration thus described above, even in a case when there is no object placed other than an operation-target object, a user can easily make a non-position attribute value for the operation-target object match a prescribed value by using the information processing apparatus 100. As a result, even in such a case, a user can easily edit or create a layout providing a sense of unity in design by using the information processing apparatus 100. In particular, in a case when the information processing apparatus 100 is applied to the album ordering system 10, a user can easily edit or create album data for use to create a photo album having layouts providing a sense of unity in design by using the information processing apparatus 100.

Third Embodiment

Figure 15:
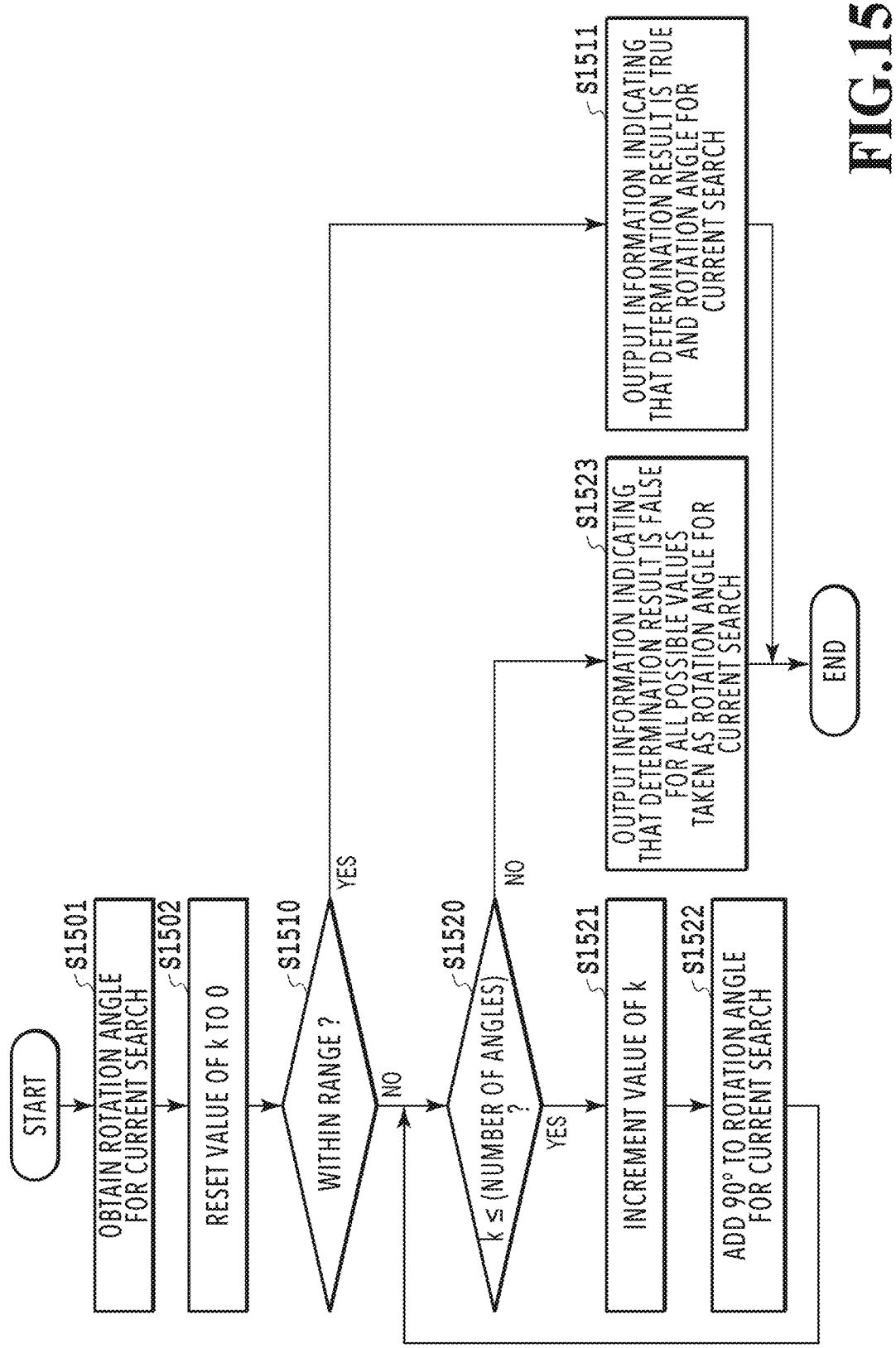
FIG. 15 is a flowchart showing an example of operation for performing rotation angle changing processing.

With reference to FIG. 15, details of an information processing apparatus 100 according to Embodiment 3 are described. The description assumes that the information processing apparatus 100 according to Embodiment 3 is applied to the album ordering system 10. The information processing apparatus 100 according to Embodiment 3 includes an operation obtaining unit 110, an attribute value changing unit 120, an operation determining unit 130, an attribute value extracting unit 140, an attribute value determining unit 150, and an output controlling unit 190. Note that the attribute value changing unit 120 and the attribute value determining unit 150 according to Embodiment 3 are what the attribute value changing unit 120 and the attribute value determining unit 150 in the information processing apparatus 100 according to Embodiment 1 are partially modified in function.

There may be a case when a user wants to rotate an object placed on a two-page spread by performing a user operation and make the rotation angle of the object match an angle different by 90°, 180°, or 270° from the rotation angle of a different object different from the object. With the non-position attribute value inputting method described in Embodiment 1, a user cannot easily make the rotation angle of an object match such an angle. The information processing apparatus 100 according to Embodiment 3 can solve such a problem. Note that the description is given assuming that the information processing apparatus 100 according to Embodiment 3 is configured by the hardware exemplified in FIG. 4, like the information processing apparatus 100 according to Embodiment 1. The description also assumes that the processing by the units in the information processing apparatus 100 according to Embodiment 3 is implemented by the editing app installed to the information processing apparatus 100, like the information processing apparatus 100 according to Embodiment 1. Note that the following description omits descriptions for the configurations and processing that are the same as those in Embodiment 1.

The attribute value determining unit 150 according to Embodiment 1 determines whether the current value of the rotation angle of a change object is a value within a range predefined based on the rotation angle of a different object. By contrast, the attribute value determining unit 150 according to Embodiment 3 not only performs the same determination as that performed by the attribute value determining unit 150 according to Embodiment 1, but also performs the following determination. The attribute value determining unit 150 according to Embodiment 3 also determines whether the current value of the rotation angle of a change object is a value within a range predefined based on a sum value obtained by adding a predefined angle to a rotation angle extracted by the attribute value extracting unit 140. The predefined angle is an angle of a whole-number multiple of 90°, such as 90°, 180°, or 270°.

Also, in a case when a result of the determination by the attribute value determining unit 150 according to Embodiment 1 is true, the attribute value changing unit 120 according to Embodiment 1 changes the rotation angle of a change object to a rotation angle extracted by the attribute value extracting unit 140. By contrast, the attribute value changing unit 120 according to Embodiment 3 performs the following processing in addition to the same processing as that performed by the attribute value determining unit 150 according to Embodiment 1. In a case when the attribute value determining unit 150 determines that the current value of the rotation angle of the change object is a value within a range predefined based on a sum value, the attribute value changing unit 120 according to Embodiment 3 changes the rotation angle of the change object to the sum value.

With reference to FIG. 15, a description is given of the process flow of the rotation angle changing processing of the object by the information processing apparatus 100 according to Embodiment 3. FIG. 15 is a flowchart showing an example of part of how the information processing apparatus 100 according to Embodiment 3 operates in performing the object rotation angle changing processing. The information processing apparatus 100 according to Embodiment 3 executes the processing in the flowchart shown in FIG. 15 in place of the processing of S1105 shown in FIG. 11. First, the information processing apparatus 100 according to Embodiment 3 executes the processing of S901 and the processing of S902 shown in FIG. 9 sequentially. After S902, the information processing apparatus 100 according to Embodiment 3 executes the following processing in place of the processing of S903. First, the information processing apparatus 100 executes the processing of S1101 to the processing of S1104 shown in FIG. 11 sequentially. After S1104, the information processing apparatus 100 executes the processing in the flowchart shown in FIG. 15 in place of the processing of S1105.

In S1501, the attribute value determining unit 150 obtains the rotation angle of a currently-searched object as a rotation angle for current search. The rotation angle for a current search obtained by the attribute value determining unit 150 in S1501 is the same as the rotation angle of a currently-searched object obtained by the attribute value extracting unit 140 in S1104 shown in FIG. 11. Next, in S1502, the attribute value determining unit 150 resets the value of a loop index k to zero. Next, in S1510, the attribute value determining unit 150 determines whether the current value of the rotation angle of the change object is a value within a range predefined based on the rotation angle for current search. Specifically, for example, the attribute value determining unit 150 calculates the difference between the rotation angle of the change object and the rotation angle for current search and determines whether the difference is a value within the predefined range. A description of the predefined range has already been given and is, therefore, not given here.

If a result of the determination by the attribute value determining unit 150 in S1510 is true, in S1511, the attribute value determining unit 150 outputs information indicating that the determination result is true and the rotation angle for current search as the rotation angle of the currently-searched object. After S1511, the information processing apparatus 100 ends the flowchart shown in FIG. 15 and executes the processing of S1107 shown in FIG. 11. If a result of the determination by the attribute value determining unit 150 in S1510 is false, in S1520, the attribute value determining unit 150 determines whether the value of the loop index k is equal to or less than the number of predefined angles. For example, the number of predefined angles is three in a case when the predefined angles are 90°, 180°, and 270°. If a result of the determination by the attribute value determining unit 150 in S1520 is true, in S1521, the attribute value determining unit 150 increments the value of the loop index k. After S1521, in S1522, the attribute value determining unit 150 adds 90° to the rotation angle for current search and sets the rotation angle for current search obtained by the addition as a new rotation angle for current search. After S1522, the information processing apparatus 100 proceeds back to S1510 and executes the processing of S1510. If a result of the determination by the attribute value determining unit 150 in S1520 is false, in S1523 the attribute value determining unit 150 outputs information indicating that the determination result in S1510 is false for all the possible values that the rotation angle for current search can take. After S1523, the information processing apparatus 100 ends the flowchart shown in FIG. 15 and executes the processing of S1110 shown in FIG. 11. Processing after that is the same as that shown in FIG. 9 or 11 and is, therefore, not described here.

By using the information processing apparatus 100 thus configured, a user can easily make the rotation angle of an operation-target object match a rotation angle different by a predefined angle from the rotation angle of a different object different from the object. As a result, by using the information processing apparatus 100, a user can easily edit or create a layout providing a sense of unity in design. In particular, in a case when the information processing apparatus 100 is applied to the album ordering system 10, a user can easily edit or create album data for use to create a photo album having layouts providing a sense of unity in design by using the information processing apparatus 100.

Note that the information processing apparatus 100 according to Embodiment 1 excludes a change object from currently-searched objects in the processing of S1103 shown in FIG. 11. Alternatively, the information processing apparatus 100 may include the change object as one of the currently-searched objects by omitting the processing of S1103 shown in FIG. 11. Specifically, for example, in a case when a currently-searched object is the change object, in S1501, the attribute value determining unit 150 obtains the rotation angle in the drag start information as a rotation angle for current search. By using the information processing apparatus 100 thus configured, a user can easily make the rotation angle of an operation-target object match a rotation angle different by a predefined angle from the rotation angle of the object at the time of the start of the rotation operation thereon.

Fourth Embodiment

Figure 16:
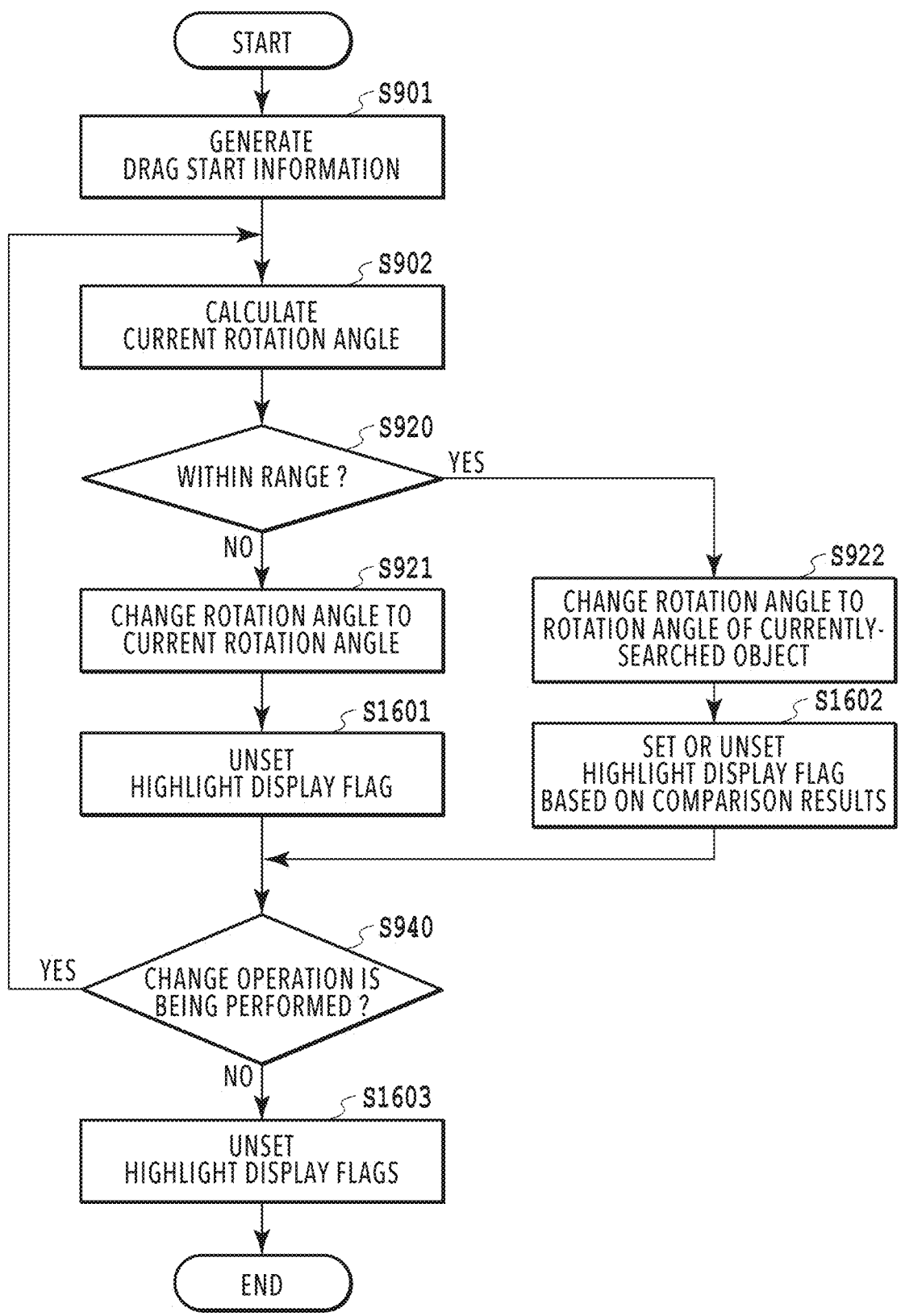
FIG. 16 is a flowchart showing an example of operation for performing non-position attribute value changing processing.
Figure 17:
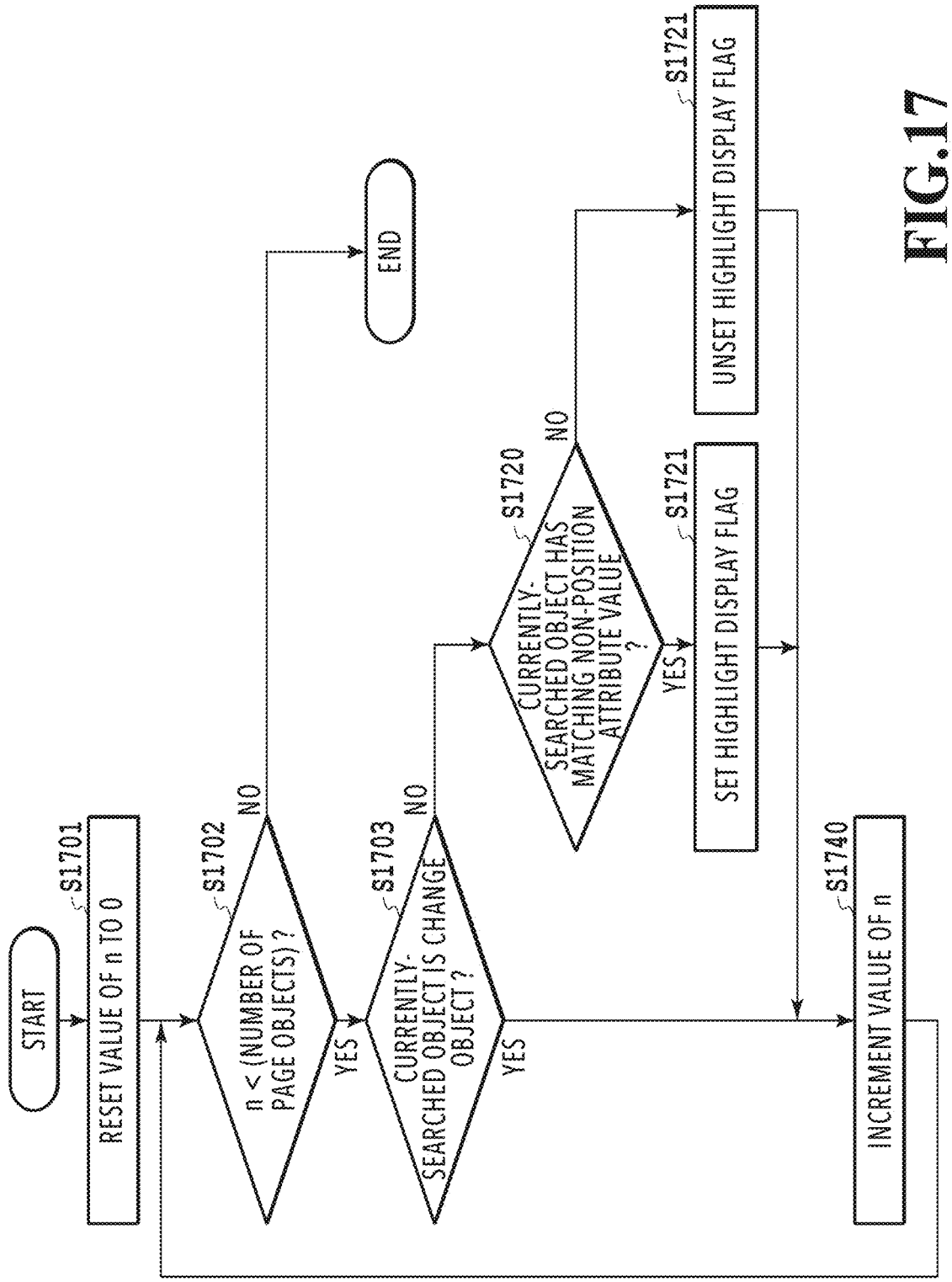
FIG. 17 is a flowchart showing an example process flow of processing of S1602.

With reference to FIGS. 16 and 17, an information processing apparatus 100 according to Embodiment 4 is described. The description assumes that the information processing apparatus 100 according to Embodiment 4 is applied to the album ordering system 10. The information processing apparatus 100 according to Embodiment 4 includes an operation obtaining unit 110, an attribute value changing unit 120, an operation determining unit 130, an attribute value extracting unit 140, an attribute value determining unit 150, match extracting unit 160, and an output controlling unit 190. Note that the output controlling unit 190 according to Embodiment 4 is what the output controlling unit 190 in the information processing apparatus 100 according to Embodiment 1 is partially modified in function.

In a case when a change object and a plurality of different objects are placed on the same two-page spread, a user may want to perform an operation of changing a non-position attribute value for the change object while checking which of the different objects has a non-position attribute value matching the non-position attribute value for the change object. The information processing apparatus 100 according to Embodiment 4 can satisfy such user needs. Note that the description is given assuming that the information processing apparatus 100 according to Embodiment 4 is configured by the hardware exemplified in FIG. 4, like the information processing apparatus 100 according to Embodiment 1. The description also assumes that the processing by the units in the information processing apparatus 100 according to Embodiment 4 is implemented by the editing app installed to the information processing apparatus 100, like the information processing apparatus 100 according to Embodiment 1. Note that the following description omits descriptions for the configurations and processing that are the same as those in Embodiment 1.

From among different objects placed on the same two-page spread as a change object (such different objects are hereinafter referred to as "different objects on the page"), the match extracting unit 160 extracts a different object whose non-position attribute value matches the current value of the non-position attribute value for the change object. In the following description, a different object extracted by the match extracting unit 160 is referred to as a match object. Specifically, for example, the match extracting unit 160 compares the current value of a non-position attribute value for the change object with each of attribute values that correspond to the same non-position attribute as the non-position attribute value for the change object and that are included in object information pieces corresponding to the respective different objects on the page. As a result of the comparison, with respect to a different object on the page that has the same non-position attribute value as the current value of the non-position attribute value for the change object, the match extracting unit 160 sets the highlight display flag included in the object information corresponding this different object on the page. In other words, a different object on the page the object information on which has a highlight display flag being set is a match object. Similarly, as a result of the comparison, with respect to a different object on the page that does not have the same non-position attribute value as the current value of the non-position attribute value for the change object, the match extracting unit 160 unsets the highlight display flag included in the object information corresponding this different object on the page.

Like the output controlling unit 190 according to Embodiment 1, the output controlling unit 190 according to Embodiment 4 generates a display image and outputs the generated display image to the display output apparatus 11 as display information, thereby displaying the display image on the display output apparatus 11. Note that, like the output controlling unit 190 according to Embodiment 1, the output controlling unit 190 according to Embodiment 4 is processed by the CPU 411 in parallel with the units in the information processing apparatus 100 other than the output controlling unit 190.

The output controlling unit 190 according to Embodiment 4 generates a display image in which a representation of a different object on the page is different depending on whether the current value of the non-position attribute value for the change object matches with the non-position attribute value for the different object on the page. The output controlling unit 190 finds out whether the current value of a non-position attribute value for the change object matches a non-position attribute value for a different object on the page by, for example, referring to the highlight display flag included in the object information corresponding to the different object on the page. In a case when the current value of the non-position attribute value for the change object matches a position attribute value for a different object on the same, the output controlling unit 190 displays the different object on the page in a highlighted manner so that the different object on the page may visually stand out to be distinguishable to the user. In the following description, a different object on the page being displayed in a highlighted manner to be distinguishable to a user is referred to as being "highlight-displayed." Meanwhile, in a case when the current value of a non-position attribute value for the change object does not match a non-position attribute value for a different object on the same, the output controlling unit 190 does not highlight-display the different object on the page.

FIG. 6 shows an example display image in which the object 516-2 is highlight-displayed by being surrounded by a broken-line rectangle 617, the object 516-2 having a rotation angle matching the current value of the rotation angle of the object 516-1, which is a change object. Note that the representation for highlight display is not limited to surrounding an object with a broken-line rectangle, and may be any representation as long as the representation makes an object stand out to be distinguishable to a user.

With reference to FIG. 16, a description is given of the process flow of non-position attribute value changing processing by the information processing apparatus 100 according to Embodiment 4. FIG. 16 is a flowchart showing an example of how the information processing apparatus 100 according to Embodiment 4 operates in performing the non-position attribute value changing processing. The flowchart shown in FIG. 16 has processing of S1601 added between the processing of S921 and the processing of S940 in the flowchart shown in FIG. 9 and has processing of S1602 added between the processing of S922 and the processing of S940. Also, the flowchart shown in FIG. 16 has processing of S1603 added after the processing of S940 in the flowchart shown in FIG. 9, S940 being reached in a case when the determination result in S940 is false.

First, the information processing apparatus 100 sequentially executes the processing of S901 to the processing of S921 or the processing of S901 to the processing of S922 shown in FIG. 16. After S921, in S1601, the match extracting unit 160 unsets all the highlight display flags included in the object information pieces corresponding to the different objects on the page. After S1601, the information processing apparatus 100 executes the processing of S940. After S922, in S1602, the match extracting unit 160 compares the current value of the non-position attribute value for the change object with non-position attribute values for the respective different objects on the page and sets or unsets their highlight display flags based on the comparison results. Details of the processing of S1602 will be described later. After S1602, the information processing apparatus 100 executes the processing of S940. If the determination result in S940 is false, in S1603 the match extracting unit 160 unsets all the highlight display flags included in the object information pieces corresponding to the respective different objects on the page. After S1603, the information processing apparatus 100 ends the processing in the flowchart shown in FIG. 16.

With reference to FIG. 17, the processing of S1602 in the flowchart shown in FIG. 16 is described. FIG. 17 is a flowchart showing an example process flow of the processing of S1602 in the flowchart shown in FIG. 16. In S1701, the match extracting unit 160 resets the value of a loop index n to zero. Next, in S1702, the match extracting unit 160 determines whether the value of the loop index n is less than the number of objects placed on the same two-page spread as the change object (i.e., page objects). If a result of the determination by the match extracting unit 160 in S1702 is true, in S1703, the match extracting unit 160 determines whether the page object corresponding to the value of the loop index n (a currently-searched object) is the change object. If a result of the determination by the match extracting unit 160 in S1703 is true, in S1740, the match extracting unit 160 increments the value of the loop index n. After S1740, the information processing apparatus 100 proceeds back to S1702 and executes the processing of S1702.

If a result of the determination by the match extracting unit 160 in S1703 is false, in S1720, the match extracting unit 160 determines whether the non-position attribute value for the change object on which the change operation is being performed matches a non-position attribute value for the currently-searched object, which is of the same non-position attribute as the non-position attribute value on which the change operation is being performed. If a result of the determination by the match extracting unit 160 in S1720 is true, in S1721 the match extracting unit 160 sets the highlight display flag included in the object information corresponding to the currently-searched object. After S1721, the information processing apparatus 100 executes the processing of S1740 described above. If a result of the determination by the match extracting unit 160 in S1720 is false, in S1722, the match extracting unit 160 unsets the highlight display flag included in the object information corresponding to the currently-searched object. After S1722, the information processing apparatus 100 executes the processing of S1740 described above. After executing the processing in and after S1703 on all of the page objects, i.e., if a result of the determination by the match extracting unit 160 in S1702 is false, the information processing apparatus 100 ends the processing in the flowchart shown in FIG. 17.

By using the information processing apparatus 100 thus configured, a user can easily check which object on the same two-page spread has a non-position attribute value matching the non-position attribute value for the operation-target object. Thus, by using the information processing apparatus 100, a user can easily input a non-position attribute value for an operation-target object such that the non-position attribute value matches a non-position attribute value for a desired object. As a result, by using the information processing apparatus 100, a user can easily edit or create a layout providing a sense of unity in design. In particular, in a case when the information processing apparatus 100 is applied to the album ordering system 10, a user can easily edit or create album data for use to create a photo album having layouts providing a sense of unity in design by using the information processing apparatus 100.

Fifth Embodiment

Figure 18:
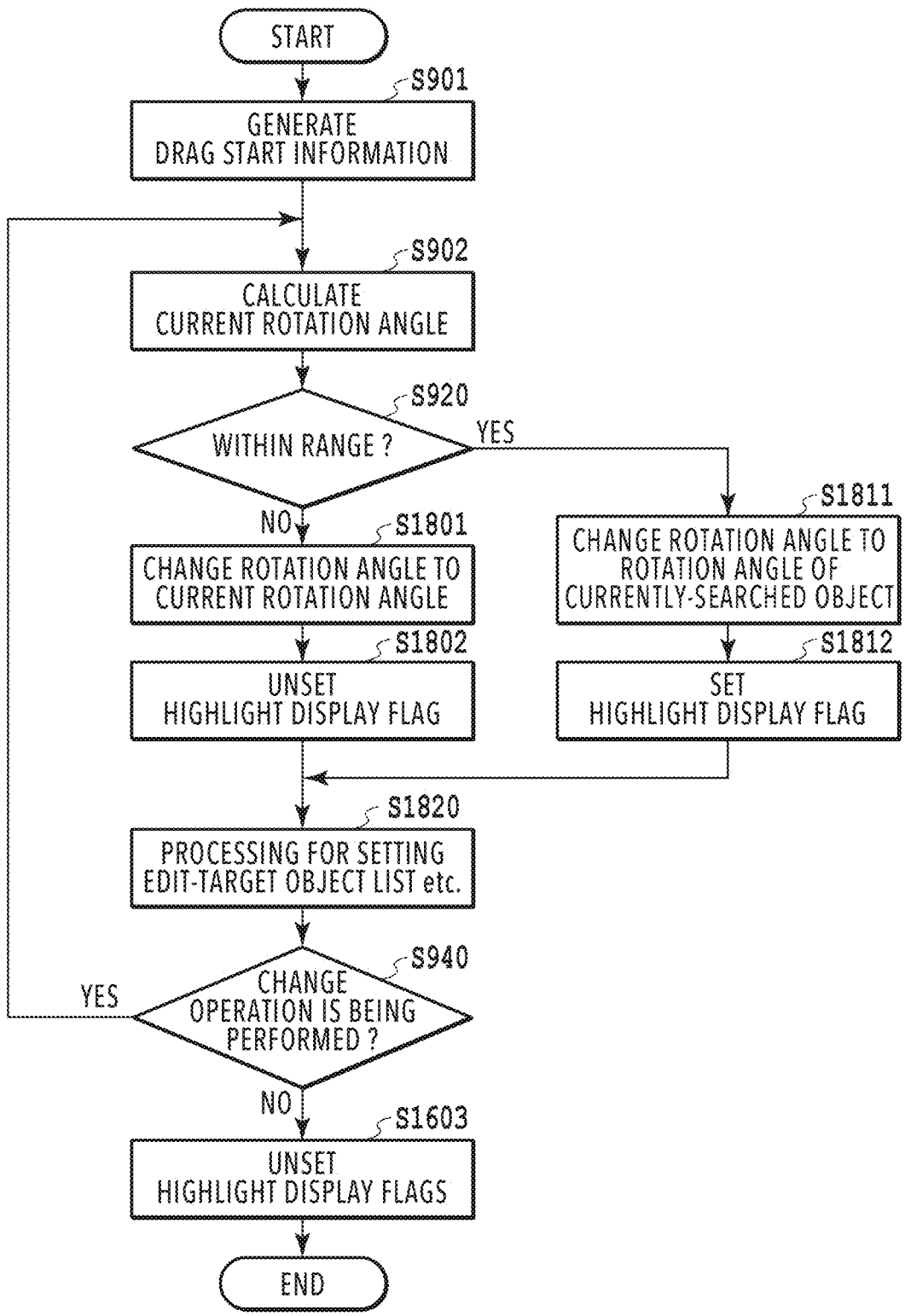
FIG. 18 is a flowchart showing an example of operation to perform rotation angle changing processing.
Figure 19:
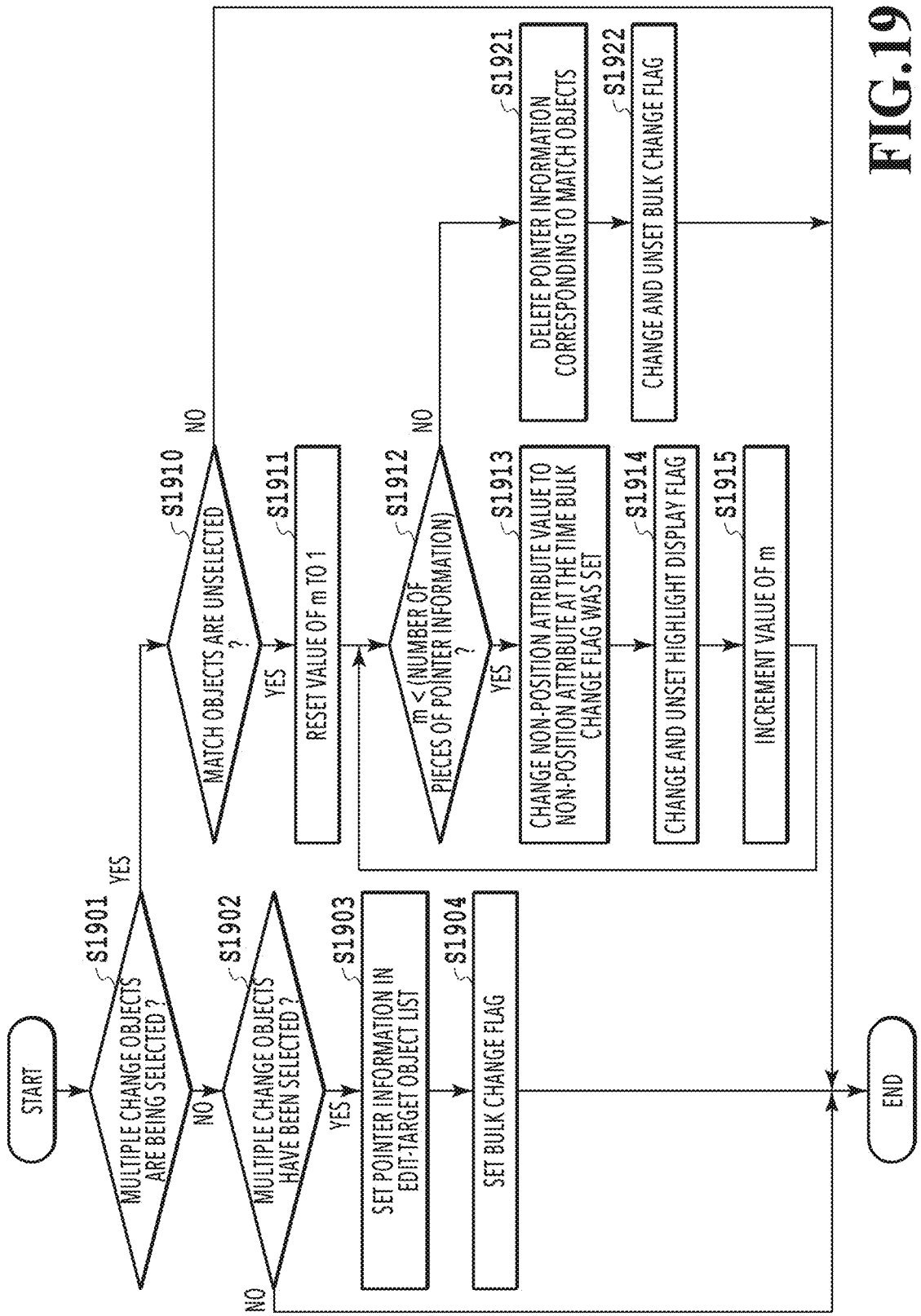
FIG. 19 is a flowchart showing an example process flow of processing of S1820.

With reference to FIGS. 18 and 19, the information processing apparatus 100 according to Embodiment 5 is described. The description assumes that the information processing apparatus 100 according to Embodiment 5 is applied to the album ordering system 10. The information processing apparatus 100 according to Embodiment 5 includes an operation obtaining unit 110, an attribute value changing unit 120, an operation determining unit 130, an attribute value extracting unit 140, an attribute value determining unit 150, match extracting unit 160, bulk selecting unit 170, and an output controlling unit 190. Note that the attribute value changing unit 120 and the output controlling unit 190 according to Embodiment 5 are what the attribute value changing unit 120 and the output controlling unit 190 in the information processing apparatus 100 according to Embodiment 4 are partially modified in function.

There may be a case when a user wants to change non-position attribute values for a plurality of objects placed on the same two-page spread in bulk with the non-position attribute values matching one another. To change non-position attribute values for a plurality of objects in bulk with the non-position attribute values matching one another by using the non-position attribute value inputting method described in Embodiment 4, a user needs to perform the following two-stage operation. First, once a non-position attribute value for a change object matches a non-position attribute value for a desired different object, a user ends the operation of changing the non-position attribute value for the change object. Next, the user reselects, as change objects, a plurality of objects for which the user wants to change the non-position attributes values in bulk with the non-position attributes values matching one another, and then performs an operation of changing the non-position attribute values for these plurality of change objects. Thus, with the non-position attribute value inputting method described in Embodiment 4, it takes work to change non-position attribute values for a plurality of change objects in bulk with the non-position attribute values matching one another.

The information processing apparatus 100 according to Embodiment 5 can facilitate the operation of changing non-position attribute values for a plurality of change objects in bulk with the non-position attribute values matching one another. Note that the description is given assuming that the information processing apparatus 100 according to Embodiment 5 is configured by the hardware exemplified in FIG. 4, like the information processing apparatus 100 according to Embodiment 1. The description also assumes that the processing by the units in the information processing apparatus 100 according to Embodiment 5 is implemented by the editing app installed to the information processing apparatus 100, like the information processing apparatus 100 according to Embodiment 1. Note that the following description omits descriptions for the configurations and processing that are the same as those in Embodiment 4.

The bulk selecting unit 170 operates in a case when there is a match object. Like the output controlling unit 190 according to Embodiment 4, the output controlling unit 190 according to Embodiment 5 may generate a display image where a match object is highlight-displayed. In this case, for example, the bulk selecting unit 170 operates in a case when a display image where a match object is highlight-displayed has been generated by the output controlling unit 190. The following description assumes that there is a match object and that the match object is being highlight-displayed.

Based on operation information obtained by the operation obtaining unit 110, the bulk selecting unit 170 selects a change object and a match object in bulk as a plurality of change objects. For example, while performing a drag operation on a rotation icon, a slider knob icon, or the like, to change a non-position attribute value for a change object using a mouse, a user additionally performs a predefined operation such as pressing down of a Shift key or a Ctrl key. In response to the input of such a user operation, the bulk selecting unit 170 selects the change object and the match object in bulk as a plurality of change objects. Note that the operation of selecting a change object and a match object in bulk as a plurality of change objects is not limited to pressing down a Shift key or Ctrl key. The following description assumes that pressing down of a Shift key is assigned to this operation.

After selecting a change object and a match object in bulk as a plurality of change objects in response to a user operation, the bulk selecting unit 170 may unselect the match object selected as a change object based on operation information corresponding to a predefined user operation. For example, as long as a Shift key is being pressed down, the bulk selecting unit 170 maintains the state where the change object and the match object are selected in bulk as a plurality of change objects. Then, once the pressing down of the Shift key ends, the bulk selecting unit 170 unselects the match object selected as a change object. The operation of maintaining the state where the change object and the match object are selected in bulk as a plurality of change objects and the operation of unselecting the matching object selected as a change object are not limited to the above operations.

In accordance with a change in the operation position corresponding to operation information obtained by the operation obtaining unit 110, the attribute value changing unit 120 changes, in bulk, non-position attribute values for the respective change objects selected by the bulk selecting unit 170. Specifically, for example, a user changes the position of a mouse cursor while continuing a drag operation and an operation of pressing down a Shift key, which is an operation for selecting a change object and a match object in bulk as a plurality of change objects. In response to the input of such a user operation, the attribute value changing unit 120 changes non-position attribute values for the respective plurality of change objects in bulk. By using the information processing apparatus 100 thus configured, a user can easily perform an operation of changing non-position attribute values for a plurality of change objects in bulk with the non-position attribute values matching one another.

A description is given of a case when, while the attribute value changing unit 120 is changing non-position attribute values of a respective plurality of change objects in bulk, an unselecting operation is performed on some or all of the match objects selected as change objects. In this case, for example, the attribute value changing unit 120 changes the non-position attribute value for the unselected match object to its non-position attribute value at the time the change object and the match object were selected in bulk as a plurality of change objects. This configuration allows a user to easily change a non-position attribute value for a match object that has been erroneously selected as a change object, back to the original non-position attribute value. As an example, the following describes a case when, while the attribute value changing unit 120 is changing non-position attribute values of a respective plurality of change objects in bulk, an unselecting operation is performed on all of the match objects selected as change objects.

The output controlling unit 190 may have the following function in addition to the function of the output controlling unit 190 according to Embodiment 4. For example, in response to a predefined operation such as pressing down of a Shift key, the output controlling unit 190 outputs a notification indicating that the change object and the match objects can be selected in bulk as a plurality of change objects. Also, in response to a predefined operation, the output controlling unit 190 may output a notification indicating that, with the change object and the match objects being handled as a plurality of change objects, non-position attribute values of these plurality of change objects can be changed in bulk. Specifically, for example, the output controlling unit 190 generates a display image including a character string indicative of the above in a message display region 613 shown in FIG. 6.

With reference to FIG. 18, a description is given of the process flow of the non-position attribute value changing processing by the information processing apparatus 100. FIG. 18 is a flowchart showing an example of how the information processing apparatus 100 according to Embodiment 5 operates in performing rotation angle changing processing of an object. The flowchart shown in FIG. 18 is such that the processing of S921 and S922 and the processing of S1601 and S1602 in the flowchart shown in FIG. 16 are changed to processing of S1801 and S1811 and processing of S1802 and S1812, respectively. Also, the flowchart shown in FIG. 18 has processing of S1820 added between processing of S1802 and S1812 and the processing of S940.

Before describing the flowchart shown in FIG. 18, processing of S1820 shown in FIG. 18 is described with reference to FIG. 19. FIG. 19 is a flowchart showing an example process flow of processing of S1820 shown in FIG. 18. First, in S1901, the bulk selecting unit 170 determines whether a plurality of objects having matching non-position attribute values are being selected as change objects. For example, the bulk selecting unit 170 performs the determination of S1901 by determining whether an edit target object list to be described later has a plurality of pieces of pointer information corresponding to change objects. The bulk selecting unit 170 may perform the determination of S1901 by determining whether a bulk change flag is set, the bulk change flag indicating whether a bulk change mode is enabled to allow non-position attribute values for a plurality of change objects to be changed in bulk.

If a result of the determination by the bulk selecting unit 170 in S1901 is false, in S1902, the bulk selecting unit 170 determines whether a user operation has been performed to select a change object and match objects in bulk as a plurality of change objects. If a result of the determination by the bulk selecting unit 170 in S1902 is false, the information processing apparatus 100 ends the processing in the flowchart shown in FIG. 19. If a result of the determination by the bulk selecting unit 170 in S1902 is true, in S1903 the bulk selecting unit 170 sets, in an edit target object list exemplified in FIG. 10C, pieces of pointer information pointing to pieces of object information on the respective match objects. Here, pointer information pointing to object information on the change object is set at the top of the edit target object list (edit target object list [0]). In other words, each of the pieces of object information corresponding to the plurality of pieces of pointer information set in the edit target object list is object information corresponding to either the change object or the match object selected as a change object by the bulk selecting unit 170. After S1903, in S1904, the bulk selecting unit 170 sets the bulk change flag. After S1903, the information processing apparatus 100 ends the processing in the flowchart shown in FIG. 19.

If a result of the determination by the bulk selecting unit 170 in S1901 is true, in S1910, the bulk selecting unit 170 determines whether a user operation has been performed to unselect the match objects being selected as change objects. If a result of the determination by the bulk selecting unit 170 in S1910 is false, the information processing apparatus 100 ends the processing in the flowchart shown in FIG. 19. If a result of the determination by the bulk selecting unit 170 in S1910 is true, in S1911, the attribute value changing unit 120 resets the value of a loop index m to 1. After S1911, in S1912, the attribute value changing unit 120 determines whether the value of the loop index m is less than the number of the pieces of pointer information set in the edit target object list.

If a result of the determination by the attribute value changing unit 120 in S1912 is true, in S1913, the attribute value changing unit 120 executes the following processing. In S1913, the attribute value changing unit 120 changes the non-position attribute value to be changed included in the object information corresponding to the pointer information set in the edit target object list [m] to the non-position attribute value at the time the bulk change flag was set. After S1913, in S1914, the match extracting unit 160 changes and unsets the highlight display flag included in the object information corresponding to the pointer information set in the edit target object list [m]. After S1914, in S1915, the attribute value changing unit 120 increments the value of the loop index m. After S1915, the information processing apparatus 100 proceeds back to the processing of S1912 and repeats the processing of S1913 to S1915 as many times as the number of the pieces of pointer information corresponding to the match objects set in the edit target object list.

If a result of the determination by the attribute value changing unit 120 in S1912 is false, in S1921, the bulk selecting unit 170 deletes the pieces of pointer information corresponding to the match objects. After S1921, in S1922, the bulk selecting unit 170 unsets the bulk change flag. After S1922, the information processing apparatus 100 ends the processing in the flowchart shown in FIG. 19.

With reference to FIG. 18, a description is given of the process flow of the non-position attribute value changing processing by the information processing apparatus 100. First, the information processing apparatus 100 sequentially executes the processing of S901 to S920 shown in FIG. 18. If a result of the determination in S920 is false, processing of S1801 and processing of S1802 are sequentially executed. In S1801, the attribute value changing unit 120 changes the rotation angle in the object information corresponding to the one or more pieces of pointer information set in the edit target object list to the current rotation angle calculated by the attribute value changing unit 120 in S902. In S1802, the match extracting unit 160 unsets all the highlight display flags included in the pieces of object information on the different objects on the page, except for the pieces of object information corresponding to the pieces of pointer information set in the edit target object list.

If a result of the determination in S920 is true, processing of S1811 and processing of S1812 are sequentially executed. In S1811, the attribute value changing unit 120 executes the same processing as that of S922 shown in FIG. 9 on the rotation angle in the object information corresponding to the one or more pieces of pointer information set in the edit target object list. After S1811, in S1812 the match extracting unit 160 sets the highlight display flag included in the object information corresponding to the currently-searched object. After S1802 or S1812, in S1820 the information processing apparatus 100 performs the processing in the flowchart exemplified in FIG. 19 to perform processing for setting the edit target object list and the like. After S1820, the information processing apparatus 100 executes the processing of S940.

By using the information processing apparatus 100 thus configured, a user can easily perform an operation of changing non-position attribute values for a plurality of change objects in bulk with the non-position attribute values matching one another. Thus, by using the information processing apparatus 100, a user can easily input a non-position attribute value for an operation-target object such that the non-position attribute value matches a non-position attribute value for a desired object. As a result, by using the information processing apparatus 100, a user can easily edit or create a layout providing a sense of unity in design. In particular, in a case when the information processing apparatus 100 is applied to the album ordering system 10, a user can easily edit or create album data for use to create a photo album having layouts providing a sense of unity in design by using the information processing apparatus 100.

Sixth Embodiment

Figure 20:
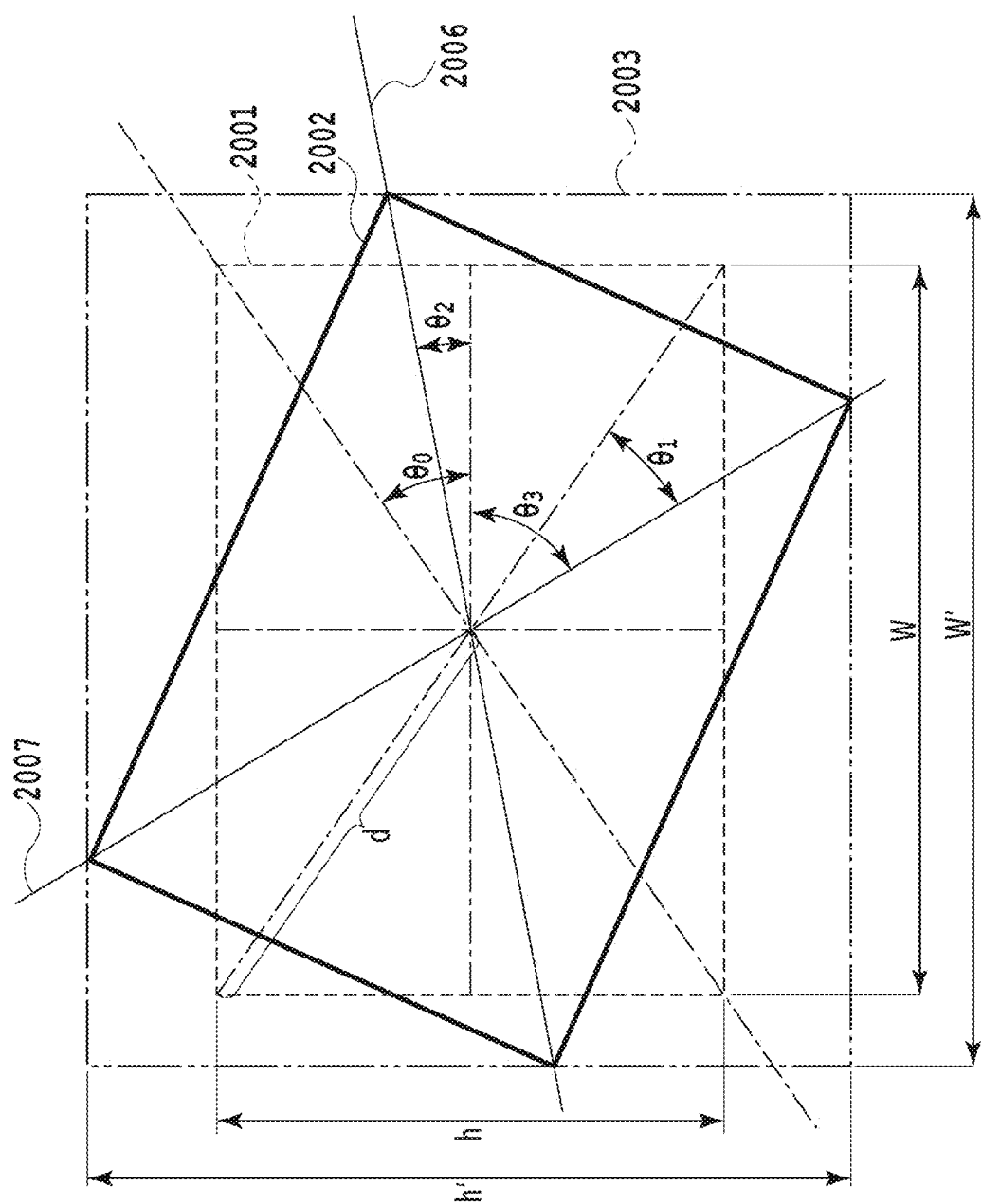
FIG. 20 is a diagram illustrating an example method for calculating the width and height of a circumscribing rectangle.
Figure 21:
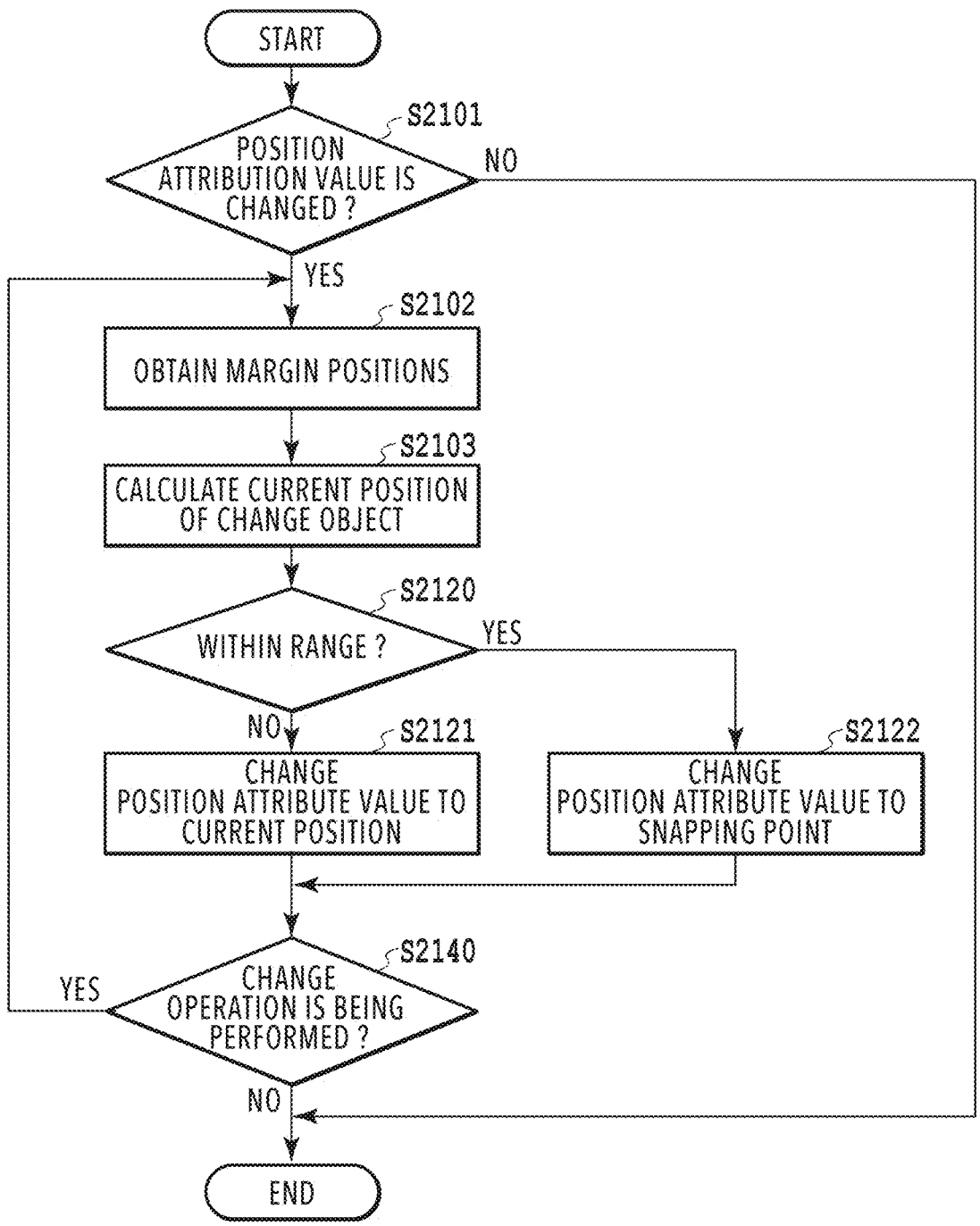
FIG. 21 is a flowchart showing an example of operation for performing position attribute value changing processing.
Figure 22:
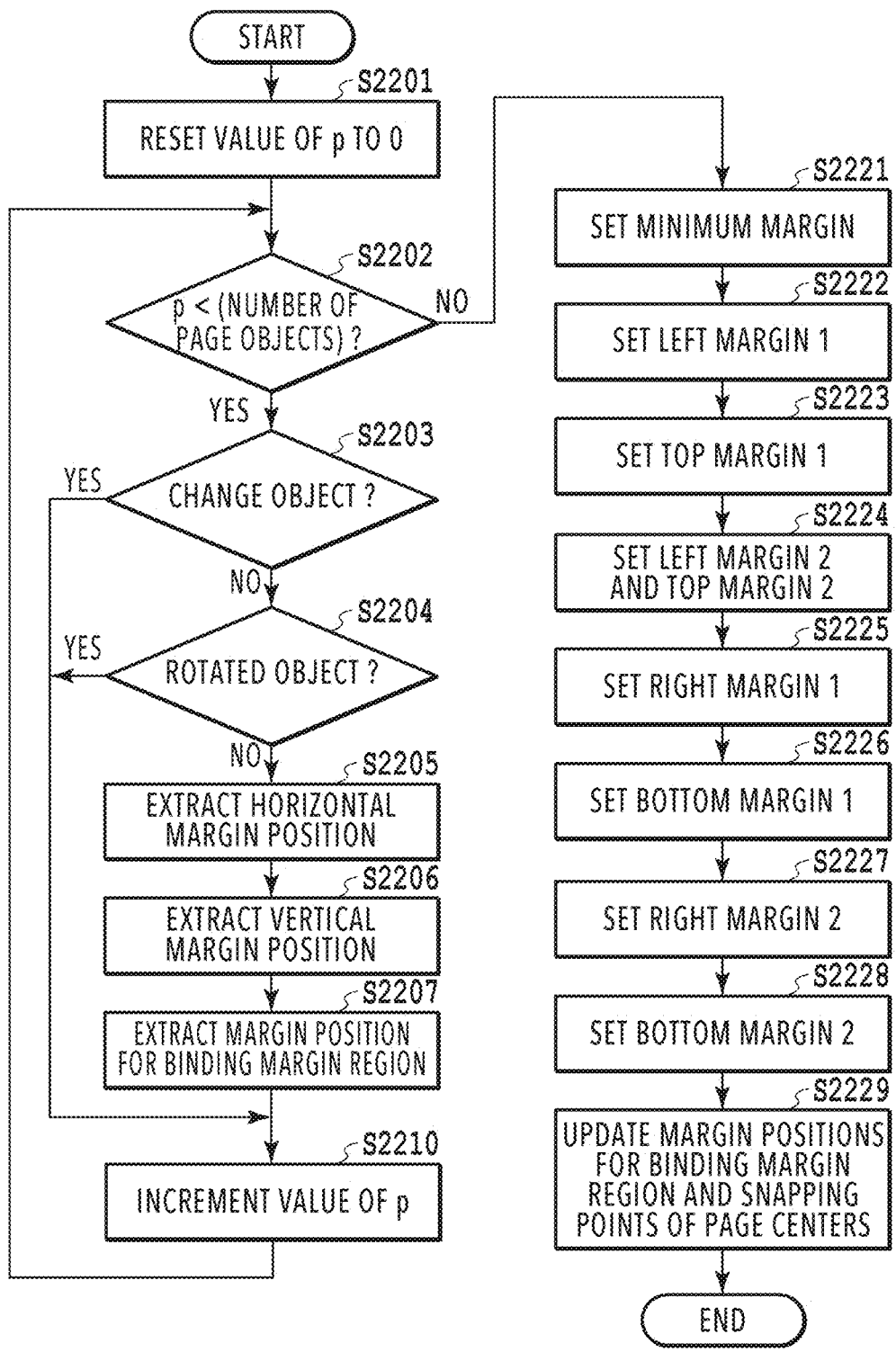
FIG. 22 is a flowchart showing an example of operation for performing margin position obtaining processing.

With reference to FIGS. 20 to 22, an information processing apparatus 100 according to Embodiment 6 is described. The description assumes that the information processing apparatus 100 according to Embodiment 6 is applied to the album ordering system 10. The information processing apparatus 100 according to Embodiment 6 includes an operation obtaining unit 110, an attribute value changing unit 120, an operation determining unit 130, an attribute value extracting unit 140, an attribute value determining unit 150, a circumscribing rectangle calculating unit 180, and an output controlling unit 190. The information processing apparatus 100 according to Embodiment 6 may include a margin border obtaining unit 181 in addition to the above configurations. Note that the attribute value changing unit 120 and the attribute value determining unit 150 according to Embodiment 6 are what the attribute value changing unit 120 and the attribute value determining unit 150 in the information processing apparatus 100 according to Embodiment 1 are partially modified in function.

Note that the information processing apparatus 100 according to Embodiment 6 is configured by the hardware exemplified in FIG. 4, like the information processing apparatus 100 according to Embodiment 1. The description also assumes that the processing by the units in the information processing apparatus 100 according to Embodiment 6 is implemented by the editing app installed to the information processing apparatus 100, like the information processing apparatus 100 according to Embodiment 1. Note that the following description omits descriptions for the configurations and processing according to Embodiment 6 that are the same as those in Embodiment 1.

For each object placed on a two-page spread and having a rotation angle other than whole-number multiples of 180° (such an object is here after referred to as a "rotated object"), the circumscribing rectangle calculating unit 180 calculates the width and height of a rectangle circumscribing the object (here after referred to as a circumscribing rectangle). For example, a circumscribing rectangle is a rectangle such that each of the sides of the circumscribing rectangle includes one of the four vertices of a rotated object and is parallel to the horizontal direction or the vertical direction of the two-page spread. With reference to FIG. 20, a description is given below of how the circumscribing rectangle calculating unit 180 calculates the width and height of a circumscribing rectangle. FIG. 20 is a diagram illustrating an example of how the circumscribing rectangle calculating unit 180 according to Embodiment 6 calculates the width and height of a circumscribing rectangle. In FIG. 20, a pre-rotated object 2001 placed on a two-page spread is shown with a broken-line rectangle, and a rotated object 2002 rotated from the object 2001 is shown with a solid-line rectangle. Also, in FIG. 20, a circumscribing rectangle 2003 for the rotated object 2002 is shown with a dash-dot-dot-line rectangle.

Since an object corresponding to a captured image (an image object) is rectangular, the distances from the center point of the object 2001 to the respective four vertices of the object 2001 are equal. This distance is denoted as d in the following description. First, the circumscribing rectangle calculating unit 180 finds the angle formed between a diagonal line of the object 2001 and the X direction. Specifically, the circumscribing rectangle calculating unit 180 obtains the width and height of the object 2001 from the object information corresponding to the object 2001 and plugs the width and the height into the following Formula (3), thereby finding the angle formed between a diagonal line of the object 2001 and the X direction:

$$\theta_0 = \arctan(h/w). \qquad \text{Formula (3)}$$

In the above formula, $\theta_0$ is the angle formed by a diagonal line of the object 2001 and the X direction, w is the width of the object 2001, and h is the height of the object 2001. An angle $\theta_2$ formed between a diagonal line 2006 of the rotated object 2002 and the X direction and an angle $\theta_3$ formed between a diagonal line 2007 of the rotated object 2002 and the X direction can be calculated as follows:

$$\theta_2 = \theta_0 - \theta_1, \text{ and}$$

$$\theta_3 = \theta_0 + \theta_1,$$

where $\theta_1$ is the angle by which the rotated object 2002 is rotated from the pre-rotated object 2001.

Thus, the width and height of a circumscribing rectangle for the rotated object 2002 can be calculated as follows:

$$w' = W\max \times d \times 2, \text{ and}$$

$$h' = H\max \times d \times 2,$$

where Wmax is the larger one of $\cos(\theta_2)$ and $\cos(\theta_3)$ in terms of absolute value, and Hmas is the larger one of $\sin(\theta_2)$ and $\sin(\theta_3)$ in terms of absolute value.

In the above formula, w' is the width of the circumscribing rectangle for the rotated object 2002, and h' is the height of the circumscribing rectangle for the rotated object 2002. Every time the attribute value changing unit 120 changes the rotation angle of an object, the circumscribing rectangle calculating unit 180 calculates the width and height of a circumscribing rectangle for the rotated object based on the rotation angle changed. Further, the circumscribing rectangle calculating unit 180 reflects the calculated width and height of the circumscribing rectangle in information indicating circumscribing rectangle size included in the object information shown in FIG. 10B and sets the value.

The attribute value changing unit 120 according to Embodiment 6 cannot only change a non-position attribute value for an operation-target object like the attribute value changing unit 120 according to Embodiment 1, but also, change a position attribute value in accordance with a change in the operation position. For example, the object snapping method described in Japanese Patent Laid-Open No. 2021-026705 can be used as a method for changing a position attribute value in accordance with a change in the operation position. Specifically, the attribute value changing unit 120 performs object snapping of an object such that a predefined position on the object, such as a vertex or the center point of the object, becomes aligned with a snapping point. Examples of a snapping point include a page edge of a two-page spread, a folding-line portion that is at substantially the center of a two-page spread, a point of note on a different object placed on a two-page spread, and a margin region border. A margin region border is, of all the objects placed on a two-page spread, a top-, bottom-, left-, or right-edge-side edge of each object nearest to the top, bottom, left, or right edge of the two-page spread and a folding-line-side edge of each object nearest to the folding line of the two-page spread.

In changing a position attribute value for an object the object information on which includes a rotation angle other than 0° or 180°, the attribute value changing unit 120 performs object snapping by using the size of a circumscribing rectangle for this object. Specifically, first, the attribute value determining unit 150 determines whether to have the attribute value changing unit 120 perform object snapping using the size of the circumscribing rectangle for the object. Based on the determination, the attribute value changing unit 120 performs object snapping using the size of the circumscribing rectangle for the object and changes a position attribute value for this object. With such a configuration, a user can easily perform an operation of aligning the position of a vertex of a rotated object in the X direction or the Y direction with the position of a point of note, such as a side, a vertex, or the like, of a different object.

A detailed description is given here of a case of snapping an object to a margin region border (such object snapping is here after referred to as "margin snapping"). In a case of changing a position attribute value for an object that is not a rotated object, margin snapping is useful in terms of aligning an edge of this object to an edge of a different object. By contrast, in a case of changing a position attribute value for a rotated object, a margin region border and each side surrounding the rotated object may intersect with each other, but never match each other. Thus, a user needs to select an operation to perform an operation of aligning a side surrounding the pre-rotated object with a margin region border or an operation of placing a vertex of the rotated object on the margin region border.

However, in either operation, it is difficult for a user to perform the operation while visually recognizing how the rotated object is located relative to the margin region border, and the resultant layout may turn out as unintended by the user. Thus, in a case of performing margin snapping on a rotated object, out of the above-described snapping points, a page edge and a folding line portion of the two-page object, a point of note on a different object placed on the two-page spread, and the like, are useful, but a margin region border is not useful. Thus, in a case of performing object snapping on a rotated object, the attribute value determining unit 150 may determine whether to have the attribute value changing unit 120 perform object snapping only targeting snapping points useful to the rotated object.

The margin border obtaining unit 181 is described. The margin border obtaining unit 181 obtains the positions of margin region borders and sets the obtained positions of the margin region borders additionally as snapping points. The margin border obtaining unit 181 obtains one of the top edges of the respective objects placed on the two-page spread that is closest to the top edge of the two-page spread, as the position of an top-edge margin region border. Similarly, the margin border obtaining unit 181 obtains ones of the bottom edges, left edges, and right edges of the respective objects placed on the two-page spread that are closest to the bottom edge, the left edge, and the right edge of the two-page spread, as the positions of the bottom-edge, left-edge, and right-edge margin region borders, respectively. The margin border obtaining unit 181 may obtain, from the right edges of the respective objects placed on the two-page spread, one that is located on the left side of the folding line portion of the two-page spread and is closest to the folding line portion, as the position of a left-edge border of a margin region near the folding line. Similarly, the margin border obtaining unit 181 may obtain, from the left edges of the respective objects placed on the two-page spread, one that is located on the right side of the folding line portion of the two-page spread and is closest to the folding line portion, as the position of a right-edge border of the margin region near the folding line. The margin region near the folding line is hereinafter referred to as a binding margin region.

A description is given of a case of obtaining the positions of margin region borders by targeting all the objects placed on the two-page spread, including a rotated object (the positions of margin region borders are hereinafter referred to as margin positions). The case described is particularly on a case when the top, bottom, left, or right edge of a rotated object is obtained as a margin position. In this case, there are two methods for defining the top, bottom, left, or right edge of a rotated object: a position corresponding to a vertex of the rotated object or a position corresponding to the top, bottom, left, or right edge of the pre-rotated object. However, in either method, it is difficult for a user to perform an operation of changing a position attribute value for an object while visually recognizing the positions of the margin positions, and the resultant layout may not turn out as intended by the user. Thus, in obtaining margin positions based on objects placed on a two-page spread, the margin border obtaining unit 181 may obtain the margin positions while excluding an object whose rotation angle is set to an angle other than whole-number multiples of 90°.

With reference to FIG. 21, a description is given of the process flow of position attribute value changing processing by the information processing apparatus 100. FIG. 21 is a flowchart showing an example of how the information processing apparatus 100 according to Embodiment 6 operates in performing the object position attribute value changing processing. The information processing apparatus 100 repeats the processing in the flowchart shown in FIG. 21 every time the information processing apparatus 100 obtains operation information corresponding to a user operation of changing a position or non-position attribute value. Note that FIG. 21 is a flowchart performed after the operation determining unit 130 determines that operation information obtained by the operation obtaining unit 110 corresponds to a user operation of changing a position or a non-position attribute value for an object, such as dragging an object. In the description below, an object on which an operation of changing a position or a non-position attribute value is being performed is referred to as a change object, and objects other than the change object are referred to as different objects. In the following description, the letter "S" denotes Step.

First, in S2101, the operation determining unit 130 determines whether the operation information corresponds to a user operation of changing a position attribute value. If a result of the determination by the operation determining unit 130 in S2101 is false, the information processing apparatus 100 ends the processing in the flowchart shown in FIG. 21 and, for example, performs non-position attribute value changing processing by executing the processing of, e.g., the flowchart shown in FIG. 9. If a result of the determination by the operation determining unit 130 in S2101 is true, in S2102, the margin border obtaining unit 181 obtains margin positions. With reference to FIG. 22, a description is given of the process flow of margin position obtaining processing by the margin border obtaining unit 181. FIG. 22 is a flowchart showing an example of how the margin border obtaining unit 181 according to Embodiment 6 operates in performing the margin position obtaining processing.

First, in S2201, the margin border obtaining unit 181 resets the value of a loop index p to zero. Next, in S2202, the margin border obtaining unit 181 determines whether the value of the loop index p is less than the number of page objects. If a result of the determination by the margin border obtaining unit 181 in S2202 is true, in S2203, the margin border obtaining unit 181 determines whether the page object corresponding to the value of the loop index p is a change object. If a result of the determination by the margin border obtaining unit 181 in S2203 is true, in S2210, the margin border obtaining unit 181 increments the value of the loop index p. After S2210, the information processing apparatus 100 proceeds back to S2202 and executes the processing of S2202. If a result of the determination by the margin border obtaining unit 181 in S2203 is false, in S2204, the margin border obtaining unit 181 determines whether the change object is a rotated object. The margin border obtaining unit 181 may determine whether the rotation angle of the change object is an angle other than 0° or 180°. If a result of the determination by the margin border obtaining unit 181 in S2204 is true, the information processing apparatus 100 executes the processing of S2210 described above.

If a result of the determination by the margin border obtaining unit 181 in S2204 is false, the margin border obtaining unit 181 extracts a horizontal margin position in S2205, extracts a vertical margin position in S2206, and extracts a margin position for the binding margin region in S2207. Note that the processing of S2205 to S2207 in the present disclosure is the same as the processing of S204 to S206 described in FIG. 2 in Japanese Patent Laid-Open No. 2021-026705 and is, therefore, not described in detail here. After S2207, the information processing apparatus 100 executes the processing of S2210 described above.

If a result of the determination by the margin border obtaining unit 181 in S2202 is false, in S2221, the margin border obtaining unit 181 compares the horizontal margin position and the vertical margin position and sets the lesser one as a minimum margin. After S2221, the margin border obtaining unit 181 sets the horizontal margin position to left margin 1 in S2222 and sets the vertical margin position to top margin 1 in S2223. After S2223, in S2224 the margin border obtaining unit 181 sets the minimum margin to left margin 2 and top margin 2. After S2224, the margin border obtaining unit 181 sets a value found by subtracting the horizontal margin position from the position of the right edge of the two-page spread to right margin 1 in S2225 and sets a value found by subtracting the vertical margin position from the position of the bottom edge of the two-page spread to bottom margin 1 in S2226.

After S2226, the margin border obtaining unit 181 sets a value found by subtracting the minimum margin from the position of the right edge of the two-page spread to right margin 2 in S2227 and sets a value found by subtracting the minimum margin from the position of the bottom edge of the two-page spread to bottom margin 2 in S2228. After S2228, in S2229 the margin positions of the binding margin region and the snapping points of the page centers are updated. Note that the processing of S2221 to S2229 in the present disclosure is the same as the processing of S209 to S219 described in FIG. 2 in Japanese Patent Laid-Open No.

2021-026705 and is, therefore, not described in detail here. After S2229, the information processing apparatus 100 ends the processing in the flowchart shown in FIG. 22 and executes processing of S2103 shown in FIG. 21.

Referring back to FIG. 21, a description is given of processing performed in and after S2103, by the information processing apparatus 100. After S2102, in S2103 the attribute value changing unit 120 calculates the current position of the change object. Specifically, first, the attribute value changing unit 120 calculates the difference between the current mouse position and the mouse position at the time of the start of the processing for moving the change object, which is included in the drag start information. Next, the attribute value changing unit 120 calculates the current center coordinates of the change object by adding the above difference to the center coordinates of the change object at the time of the start of the processing for moving the change object, which is included in the drag start information. After S2103, in S2120, the attribute value determining unit 150 determines whether a predefined position on the change object is a value within a range predefined based on any of the snapping points. Note that in a case when the change object is a rotated object, in S2120, the attribute value determining unit 150 determines whether a predefined position on a circumscribing rectangle for the change object is a value within a range predefined based on any of the snapping points. Also, in a case when the change object is a rotated object, in S2120 the attribute value determining unit 150 may perform the above determination based on snapping points excluding the margin positions.

If a result of the determination by the attribute value determining unit 150 in S2120 is false, in S2121 the attribute value changing unit 120 changes the position attribute value for the change object to the current position calculated by the attribute value changing unit 120 in S2103. Specifically, the attribute value changing unit 120 changes the position of the change object by copying the current position calculated by the attribute value changing unit 120 in S2103 to information indicating position included in the object information corresponding to the change object. After S2121, the information processing apparatus 100 executes processing of S2140.

If a result of the determination in S2120 is true, in S2122, the attribute value changing unit 120 changes the position attribute value for the change object to a snapping point determined by the attribute value determining unit 150 in S2120 as having the current position of the change object within the range predefined based thereon. After S2122, the information processing apparatus 100 executes processing of S2140. After S2121 or S2122, in S2140, the operation determining unit 130 determines whether the operation information obtained by the operation obtaining unit 110 indicates that the operation of changing the position of the change object is being performed. Specifically, for example, the operation determining unit 130 determines whether the operation information obtained by the operation obtaining unit 110 indicates that the change object on which moving processing has been started is still being dragged. If a result of the determination in S2140 is true, the information processing apparatus 100 proceeds back to S2102 and executes the processing of S2102. If a result of the determination in S2140 is false, the information processing apparatus 100 ends the processing in the flowchart shown in FIG. 21.

By using the information processing apparatus 100 thus configured, a user can easily input not only a non-position attribute value but also a position attribute value for an operation-target object such that the position attribute value matches a snapping point. As a result, by using the information processing apparatus 100, a user can easily edit or create a layout providing a sense of unity in design. In particular, in a case when the information processing apparatus 100 is applied to the album ordering system 10, a user can easily edit or create album data for use to create a photo album having layouts providing a sense of unity in design by using the information processing apparatus 100.

Seventh Embodiment

Figure 23:
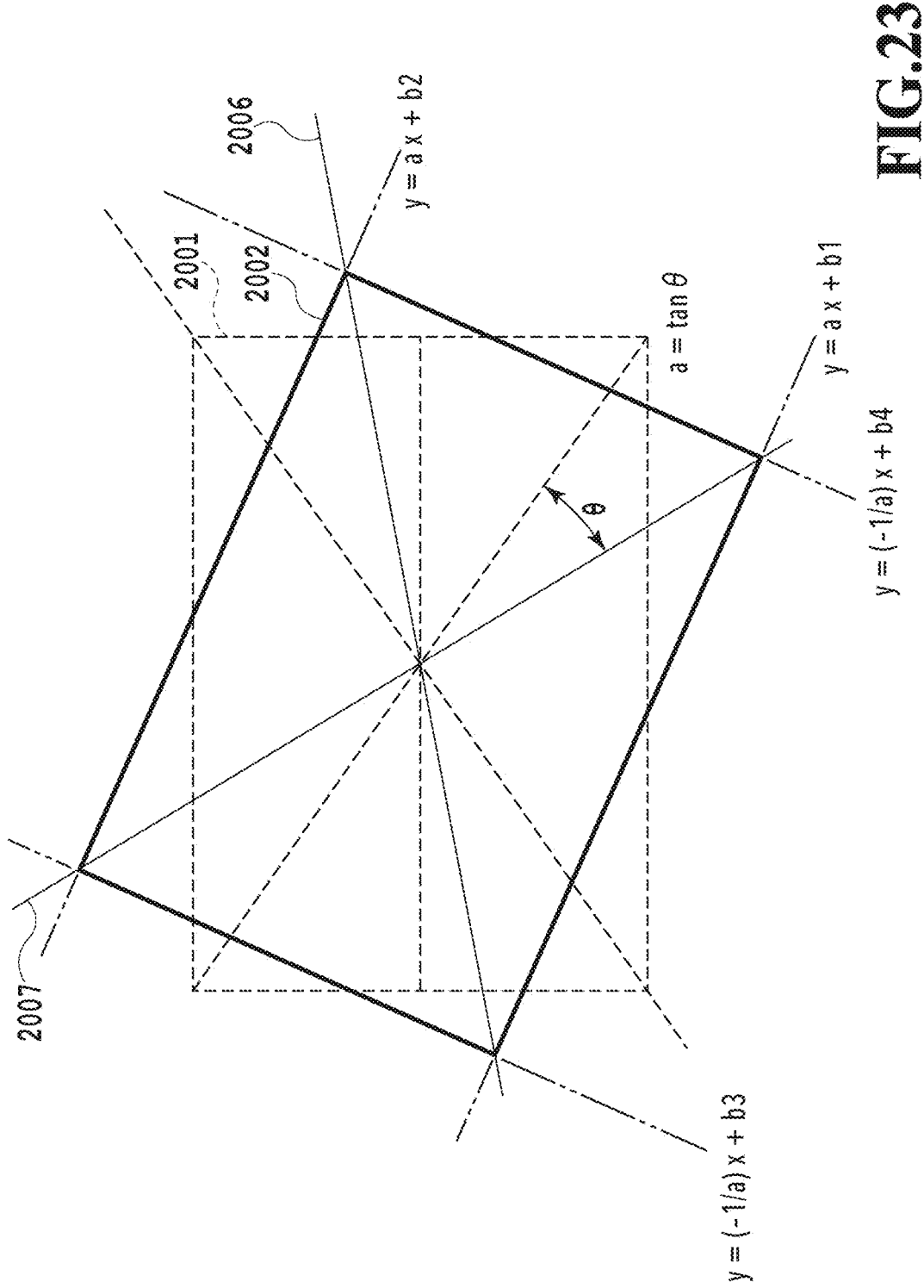
FIG. 23 is a diagram illustrating an example of straight-line equations.
Figure 24:
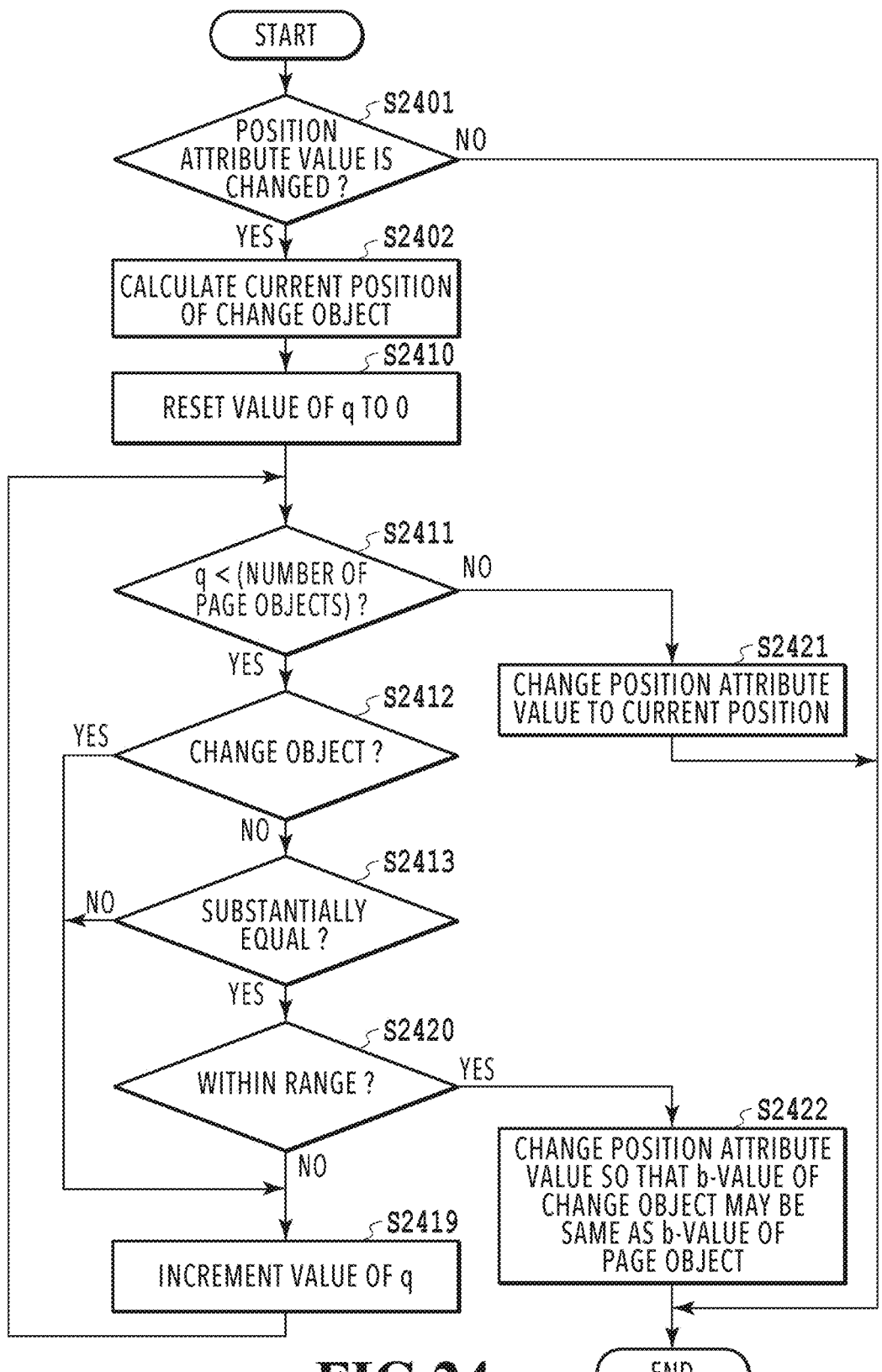
FIG. 24 is a flowchart showing an example of operation for performing position attribute value changing processing.

With reference to FIGS. 23 and 24, an information processing apparatus 100 according to Embodiment 7 is described. The description assumes that the information processing apparatus 100 according to Embodiment 7 is applied to the album ordering system 10. The information processing apparatus 100 according to Embodiment 7 includes an operation obtaining unit 110, an attribute value changing unit 120, an operation determining unit 130, an attribute value extracting unit 140, an attribute value determining unit 150, and an output controlling unit 190. Note that the attribute value changing unit 120 and the attribute value determining unit 150 according to Embodiment 7 are what the attribute value changing unit 120 and the attribute value determining unit 150 in the information processing apparatus 100 according to Embodiment 1 are partially modified in function.

In moving and re-placing a rotated object placed on a two-page spread through a user operation, a user may want to re-place the rotated object so that one side of the rotated object aligns with one side of a different rotated object having the same rotation angle as the rotated object. However, with the object snapping method described in, for example, Japanese Patent Laid-Open No. 2021-026705, it is difficult for a user to easily perform such re-placement of a rotated object. The information processing apparatus 100 according to Embodiment 7 can solve such a problem. Note that the description is given assuming that the information processing apparatus 100 according to Embodiment 7 is configured by the hardware exemplified in FIG. 4, like the information processing apparatus 100 according to Embodiment 1. The description also assumes that the processing by the units in the information processing apparatus 100 according to Embodiment 7 is implemented by the editing app installed to the information processing apparatus 100, like the information processing apparatus 100 according to Embodiment 1. Note that the following description omits descriptions for the configurations and processing that are the same as those in Embodiment 1.

The attribute value changing unit 120 according to Embodiment 7 cannot only change a non-position attribute value for an operation-target object like the attribute value changing unit 120 according to Embodiment 1, but also change a position attribute value in accordance with a change in the operation position. In a case when the rotation angle of an operation-target object is 0°, 90°, 180°, or 270°, the attribute value changing unit 120 changes a position attribute value for the object by using, for example, the object snapping method described in Japanese Patent Laid-Open No. 2021-026705. In the description below, an object on which an operation of changing a non-position attribute value or a position attribute value is being performed is referred to as a change object.

In a case when an angle other than 0°, 90°, 180°, or 270° is set as the rotation angle of a change object using, e.g., the method described in Embodiment 1, the attribute value changing unit 120 according to Embodiment 7 calculates straight-line equations corresponding to the respective sides surrounding the change object. With reference to FIG. 23, straight-line equations for an object are described. FIG. 23 is a diagram illustrating an example of straight-line equations according to Embodiment 7. A straight-line equation can be expressed by an equation showing a linear function known as y=ax+b (where a and b are any constants). A method for calculating straight-line equations corresponding to the respective sides of an object from the coordinates of each vertex of the object is publicly known and is, therefore, not described here. Note that, since an object such as an image object corresponding to a captured image is rectangular, the slope of a straight-line equation corresponding to each side of the object is either "a" or "(−1/a)". In the information processing apparatus 100, the value of "a" denoting the slope of a straight-line equation can be found as a=tan θ (where θ is the rotation angle of the object) by using the rotation angle included in the object information corresponding to the object.

The attribute value changing unit 120 calculates the values of b in the straight-line equations corresponding to the bottom side, the top side, the left side, and the right side by plugging the coordinates of the vertices of the change object into the straight-line equations (the values of b are here after referred to as "b-values"). The attribute value changing unit 120 sets the calculated b-values to a b-value list included in the object information shown in FIG. 10B. For example, b1, b2, b3, and b4 in the b-value list shown in FIG. 10B correspond to the b-values in the straight-line equations for the respective sides of a rotated object that correspond to the bottom side, the top side, the left side, and the right side of the change object having a rotation angle of 0°.

The attribute value determining unit 150 determines whether a b-value for the change object is a value within a range predefined based on a b-value of a different object whose rotation angle is equal to or different by a whole-number multiple of 90° from the rotation angle of the change object. Based on the above, a result of the determination made by the attribute value determining unit 150, it can be determined whether a straight line extended from one side of the change object on which an operation of changing its position attribute value is being performed and a straight line extended from one side of the different object are parallel and have a distance between them within a predefined range. Note that "equal" and "90°" above are not limited to being strictly equal or 90°. "Equal" may be "substantially equal" including an error within a predefined range, such as #1°, and "90°" may be "substantially 90°" including an error within a predefined range such as #1°.

With reference to FIG. 24, a description is given of the process flow of position attribute value changing processing by the information processing apparatus 100 according to Embodiment 7. FIG. 24 is a flowchart showing an example of how the information processing apparatus 100 according to Embodiment 7 operates in performing processing for changing a position attribute value for an object. The information processing apparatus 100 according to Embodiment 7 repeats the processing in the flowchart shown in FIG. 24 every time the information processing apparatus 100 obtains operation information corresponding to a user operation of changing a position or non-position attribute value. Note that FIG. 24 is a flowchart performed after the operation determining unit 130 determines that operation information obtained by the operation obtaining unit 110 corresponds to a user operation of changing a position or a non-position attribute value for an object, such as dragging the object. In the following description, the letter "S" denotes a Step.

First, in S2401, the operation determining unit 130 determines whether the operation information corresponds to a user operation of changing a position attribute value. If a result of the determination by the operation determining unit 130 in S2401 is false, the information processing apparatus 100 ends the processing in the flowchart shown in FIG. 24 and, for example, performs non-position attribute value changing processing by executing the processing of, e.g., the flowchart shown in FIG. 9. Note that, in a case when the operation information corresponds to a user operation of changing a rotation angle, the attribute value changing unit 120 calculates the above-described straight-line equations corresponding to the respective sides of the change object and sets the b-values in the b-value list in the object information. If a result of the determination by the operation determining unit 130 in S2401 is true, in S2402, the attribute value changing unit 120 calculates the current position of the change object. Specifically, the attribute value changing unit 120 first calculates the difference between the current mouse position and the mouse position at the time of the start of the processing for moving the change object, which is included in the drag start information. Next, the attribute value changing unit 120 calculates the current center coordinates of the change object by adding the above difference to the center coordinates of the change object at the time of the start of the processing for moving the change object, which is included in the drag start information.

After S2402, in S2410, the attribute value determining unit 150 resets the value of a loop index q to 0. After S2410, in S2411, the attribute value determining unit 150 determines whether the value of the loop index q is smaller than the number of page objects. If a result of the determination by the attribute value determining unit 150 in S2411 is true, in S2412, the attribute value determining unit 150 determines whether the page object corresponding to the value of the loop index q is the change object. If a result of the determination by the attribute value determining unit 150 in S2412 is true, in S2419, the attribute value determining unit 150 increments the value of the loop index q. After S2419, the information processing apparatus 100 proceeds back to S2411 and executes the processing of S2411.

If a result of the determination by the attribute value determining unit 150 in S2412 is false, in S2413, the attribute value determining unit 150 executes the following processing. In S2413, the attribute value determining unit 150 determines whether the rotation angle of the page object corresponding to the value of the loop index q is substantially equal to or is different by a whole-number multiple of substantially 90° from the rotation angle of the change object. If a result of the determination by the attribute value determining unit 150 in S2413 is false, the information processing apparatus 100 executes the processing of S2419 described above. If a result of the determination by the attribute value determining unit 150 in S2413 is true, in S2420, the attribute value determining unit 150 performs the following determination. The information processing apparatus 100 determines whether the b-values of the change object are values within ranges predefined based on the b-values of the page object corresponding to the value of the loop index q.

If a result of the determination by the attribute value determining unit 150 in S2420 is false, the information processing apparatus 100 executes the processing of S2419 described above. If a result of the determination by the attribute value determining unit 150 in S2420 is true, in S2422, the attribute value changing unit 120 executes the following processing. In S2422, the attribute value changing unit 120 changes the position attribute value for the change object so that a b-value of the change object may be the same as a b-value of the page object corresponding to the value of the loop index q. Note that, in the processing of S2422, in a case when the rotation angle of the change object is not perfectly equal to the rotation angle of the page object, the attribute value changing unit 120 may change the rotation angle of the change object to the rotation angle of the page object to make them equal. After S2422, the information processing apparatus 100 ends the processing in the flowchart shown in FIG. 24. If a result of the determination by the attribute value determining unit 150 in S2411 is false, in S2421 the attribute value changing unit 120 changes the position attribute value for the change object to the current position of the change object calculated by the attribute value changing unit 120. After S2421, the information processing apparatus 100 ends the processing in the flowchart shown in FIG. 24.

By using the information processing apparatus 100 thus configured, a user can easily place an operation-target rotated object so that one side of the rotated object may be aligned with one side of a different rotated object. As a result, by using the information processing apparatus 100, a user can easily edit or create a layout providing a sense of unity in design. In particular, in a case when the information processing apparatus 100 is applied to the album ordering system 10, a user can easily edit or create album data for use to create a photo album having layouts providing a sense of unity in design by using the information processing apparatus 100.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

The present disclosure enables easy editing that creates a layout providing a sense of unity in design.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing method comprising the steps of:
   obtaining operation information from an operation input apparatus capable of sequentially inputting a continuously changing operation position;
   changing a non-position attribute value for a first object that is an operation-target object in accordance with a change in the operation position corresponding to the operation information;
   determining whether the operation information indicates that an operation of changing the non-position attribute value is being performed;
   while the operation of changing the non-position attribute value is being performed, extracting the non-position attribute value for a second object different from the first object, the non-position attribute value of the second object being of a same attribute as the non-position attribute value on which the operation of changing is being performed;
   determining whether a current value of the non-position attribute value on which the operation of changing is being performed is a value within a range predefined based on the non-position attribute value for the second object, wherein the current value is changed to the non-position attribute value for the second object in a case when it is determined that the current value is a value within the range predefined based on the non-position attribute value for the second object;
   from a plurality of the second objects, extracting as a match object the second object having the non-position attribute value matching with the current value;
   generating a display image in which the first object and the plurality of the second objects are placed, wherein, in the display image generated, the match object and a second object other than the match object are displayed in different representations from each other; and
   based on the operation information, selecting the first object and the match object, in bulk, as a plurality of the first objects, and changing, in bulk, the non-position attribute values for the plurality of the first objects selected in bulk, in accordance with a change in the operation position corresponding to the operation information,
   wherein, in a case when the first object and the match object are being selected in bulk as the plurality of the first objects, based on the operation information, some or all of the match objects in the plurality of the first objects selected in bulk are excluded from the first objects, and the non-position attribute value for each respective excluded match object is changed back to the non-position attribute value for the respective excluded match object at a time the first object and the match object were selected in bulk as the plurality of the first objects.

2. The information processing method according to claim 1, further comprising the step of generating a display image in which the first object is placed,
   wherein, in a case when the non-position attribute value for the first object is changed, a display image, in which the non-position attribute value thus changed is reflected in the first object, is generated.

3. The information processing method according to claim 1, further comprising determining whether the current value is a value within a range predefined based on a predefined prescribed value, and
changing the current value to the prescribed value in a case when the current value is determined to be a value within the range predefined based on the prescribed value.

4. The information processing method according to claim 1, wherein, in a case when the non-position attribute value on which the operation of changing is being performed is a rotation angle of the first object,
further determining whether the current value is a value within a range predefined based on a sum value found by adding a predefined angle to the non-position attribute value for the second object, and
changing the current value to the sum value in a case when the current value is determined to be a value within the range predefined based on the sum value.

5. The information processing method according to claim 4, wherein, in a case when the non-position attribute value on which the operation of changing is being performed is a rotation angle of the first object,
the sum value found by adding an angle that is a whole-number multiple of 90° to the non-position attribute value for the second object is used in determining whether the current value is a value within the range predefined based on the sum value.

6. The information processing method according to claim 4, wherein, in a case when the non-position attribute value on which the operation of changing is being performed is rotation angle of the first object,
the rotation angle of the first object at a time of start of the operation of changing is further extracted,
further determining whether the current value is a value within a range predefined based on a sum value found by adding a predefined angle to the rotation angle of the first object at the time of the start of the operation of changing, and
changing the current value to the sum value in a case when the current value is determined to be a value within the range predefined based on the sum value.

7. The information processing method according to claim 1, wherein a notification is outputted indicating that the non-position attribute value for the first object and the non-position attribute value for the match object are changeable in bulk through a predefined user operation.

8. The information processing method according to claim 1, further comprising the step of calculating a width or a height of a circumscribing rectangle circumscribing the first object whose rotation angle is set to an angle other than whole-number multiples of one hundred eighty degrees,
further changing a position attribute value for the first object in accordance with a change in the operation position corresponding to the operation information, and
while the operation of changing is being performed on the position attribute value, in a case when an angle other than whole-number multiples of one hundred eighty degrees is set to the rotation angle of the first object, determining whether to perform object snapping of the first object to a snapping point using the width or the height of the circumscribing rectangle.

9. The information processing method according to claim 8, wherein, in determining whether to perform object snap-
ping of the first object whose rotation angle is set to an angle other than whole-number multiples of one hundred eighty degrees, only the snapping point that is useful for object snapping using the circumscribing rectangle for the first object is targeted.

10. The information processing method according to claim 8, further comprising the steps of:
obtaining a margin position based on positions and sizes of the first object and the second object; and
setting the obtained margin position as the snapping point, wherein, in the obtaining of the margin position, the margin position is obtained excluding, from the first object and the second object, the first object or the second object whose rotation angle is set to an angle other than whole-number multiples of ninety degrees.

11. The information processing method according to claim 1, wherein a position attribute value for the first object is further changed in accordance with a change in the operation position corresponding to the operation information, and
while the operation of changing the position attribute value is being performed, determining whether a distance between a first straight line calculated based on the position attribute value and the non-position attribute value for the first object and a second straight line calculated based on the position attribute value and the non-position attribute value for the second object is within a predefined range, thereby determining whether to perform object snapping of the first object to the second straight line.

12. An information processing apparatus comprising:
one or more hardware processors; and
one or more memories storing one or more programs configured to be executed by the one or more hardware processors, the one or more programs including instructions for:
obtaining operation information from an operation input apparatus capable of sequentially inputting a continuously changing operation position;
changing a non-position attribute value for a first object that is an operation-target object in accordance with a change in the operation position corresponding to the operation information;
determining whether the operation information indicates that an operation of changing the non-position attribute value is being performed;
while the operation of changing the non-position attribute value is being performed, extracting the non-position attribute value for a second object different from the first object, the non-position attribute value of the second object being of a same attribute as the non-position attribute value on which the operation of changing is being performed;
determining whether a current value of the non-position attribute value on which the operation of changing is being performed is a value within a range predefined based on the non-position attribute value for the second object, wherein the current value is changed to the non-position attribute value for the second object in a case when it is determined that the current value is a value within the range predefined based on the non-position attribute value for the second object;
from a plurality of the second objects, extracting as a match object the second object having the non-position attribute value matching with the current value;

generating a display image in which the first object and the plurality of the second objects are placed, wherein, in the display image generated, the match object and a second object other than the match object are displayed in different representations from each other; and based on the operation information, selecting the first object and the match object, in bulk, as a plurality of the first objects, and changing, in bulk, the non-position attribute values for the plurality of the first objects selected in bulk, in accordance with a change in the operation position corresponding to the operation information, wherein, in a case when the first object and the match object are being selected in bulk as the plurality of the first objects, based on the operation information, some or all of the match objects in the plurality of the first objects selected in bulk are excluded from the first objects, and the non-position attribute value for each respective excluded match object is changed back to the non-position attribute value for the respective excluded match object at a time the first object and the match object were selected in bulk as the plurality of the first objects.

13. A non-transitory computer readable storage medium storing a program for causing a computer to perform a control method of an information processing apparatus, the control method comprising the steps of:

obtaining operation information from an operation input apparatus capable of sequentially inputting a continuously changing operation position;

changing a non-position attribute value for a first object which is an operation-target object in accordance with a change in the operation position corresponding to the operation information;

determining whether the operation information indicates that an operation of changing the non-position attribute value is being performed;

while the operation of changing the non-position attribute value is being performed, extracting the non-position attribute value for a second object different from the first object, the non-position attribute value of the second object being of a same attribute as the non-position attribute value on which the operation of changing is being performed;

determining whether a current value of the non-position attribute value on which the operation of changing is being performed is a value within a range predefined based on the non-position attribute value for the second object, wherein the current value is changed to the non-position attribute value for the second object in a case when it is determined that the current value is a value within the range predefined based on the non-position attribute value for the second object;

from a plurality of the second objects, extracting as a match object the second object having the non-position attribute value matching with the current value;

generating a display image in which the first object and the plurality of the second objects are placed, wherein, in the display image generated, the match object and a second object other than the match object are displayed in different representations from each other; and based on the operation information, selecting the first object and the match object, in bulk, as a plurality of the first objects, and changing, in bulk, the non-position attribute values for the plurality of the first objects selected in bulk, in accordance with a change in the operation position corresponding to the operation information, wherein, in a case when the first object and the match object are being selected in bulk as the plurality of the first objects, based on the operation information, some or all of the match objects in the plurality of the first objects selected in bulk are excluded from the first objects, and the non-position attribute value for each respective excluded match object is changed back to the non-position attribute value for the respective excluded match object at a time the first object and the match object were selected in bulk as the plurality of the first objects.

* * * * *